US010116619B2

(12) United States Patent
McCallum et al.

(10) Patent No.: US 10,116,619 B2
(45) Date of Patent: Oct. 30, 2018

(54) SYSTEMS AND METHODS FOR PROVISIONING, CONFIGURING, DIAGNOSING, AND MAINTAINING OUT-OF BAND MANAGEMENT OF COMPUTING DEVICES

(71) Applicant: ConnectWise Inc., Tampa, FL (US)

(72) Inventors: Donald McCallum, Tampa, FL (US); Brett Alan Cheloff, Tampa, FL (US); Kevin Davis, Apollo Beach, FL (US)

(73) Assignee: Connectwise, Inc., Tampa, FL (US)

( * ) Notice: Subject to any disclaimer, the term of this patent is extended or adjusted under 35 U.S.C. 154(b) by 551 days.

(21) Appl. No.: 14/661,744

(22) Filed: Mar. 18, 2015

(65) Prior Publication Data

US 2015/0271130 A1 Sep. 24, 2015

Related U.S. Application Data

(60) Provisional application No. 61/955,220, filed on Mar. 19, 2014.

(51) Int. Cl.
G06F 15/173 (2006.01)
H04L 29/12 (2006.01)
H04L 12/24 (2006.01)

(52) U.S. Cl.
CPC ...... H04L 61/2015 (2013.01); H04L 41/0806 (2013.01)

(58) Field of Classification Search
CPC ............. H04L 61/2015; H04L 61/2061; H04L 61/2076; H04L 41/0806
USPC ........................................................ 709/223
See application file for complete search history.

(56) References Cited

U.S. PATENT DOCUMENTS

| 5,619,621 | A | 4/1997 | Puckett |
| 6,442,542 | B1 | 8/2002 | Ramani et al. |
| 7,424,525 | B2 | 9/2008 | Guarraci et al. |
| 7,705,602 | B2 | 4/2010 | Bertness |
| 7,831,997 | B2 | 11/2010 | Eldar et al. |
| 7,904,708 | B2 | 3/2011 | Harmer |
| 8,266,676 | B2 | 9/2012 | Hardjono et al. |

(Continued)

OTHER PUBLICATIONS

Altiris, Inc., The Process of Provisioning PCs with Intel vPro Technology, white paper, Aug. 15, 2008, Lindon, Utah.

(Continued)

Primary Examiner — Nicholas R Taylor
Assistant Examiner — Meng Vang
(74) Attorney, Agent, or Firm — Foley & Lardner LLP

(57) ABSTRACT

Systems and methods of the present disclosure facilitate provisioning an out-of-band system. In some embodiments, the system includes a server of a first domain, which includes a management engine. The management engine can establish a network tunnel with a device on a second domain, and modify the domain on a DHCP server on the second domain to be the first domain. The device can use a fixed subdomain of the first domain to transmit a provisioning request for an OOB management system to a provisioning engine in the first domain, which can transmit a certificate including the first domain to the device. The device can validate the certificate by comparing the domain in the certificate to the domain from the DHCP server and verify that they match. The management engine can modify the DHCP server to have the original second domain.

18 Claims, 21 Drawing Sheets

(56) References Cited

U.S. PATENT DOCUMENTS

| | | | |
|---|---|---|---|
| 8,275,735 B2 | 9/2012 | Fujimaki et al. | |
| 8,386,618 B2 | 2/2013 | Bailey et al. | |
| 8,656,490 B1* | 2/2014 | Sobel | H04L 61/1511 709/227 |
| 8,694,642 B2* | 4/2014 | Dempsky | H04L 61/1511 709/223 |
| 2004/0243596 A1* | 12/2004 | Lillqvist | H04L 29/12066 |
| 2007/0297396 A1* | 12/2007 | Eldar | H04L 63/08 370/356 |
| 2013/0005387 A1* | 1/2013 | Aso | H04W 4/005 455/517 |
| 2014/0181893 A1* | 6/2014 | Von Bokern | H04L 63/0838 726/1 |
| 2014/0250292 A1 | 9/2014 | Edwards et al. | |
| 2014/0337530 A1* | 11/2014 | Amishav | H04L 41/5058 709/226 |

OTHER PUBLICATIONS

Cutler, Terry, Alternative Approaches and Tools to Configuring Intel vPro Technology, Symantec Connect blog, Nov. 19, 2009, Mountain View, California.
Dell Kace, Dell KACE Remote Management with Intel vPro Technology, WPvPRO11.15.2011, Nov. 15, 2011, Mountain View, California.
Hewlett Packard Development Company, L.P., HP Business Notebook Intel vPro setup and configuration, 4AA2-xxxxENW, Feb. 2011, Palo Alto, California.
Hewlett Packard Development Company, L.P., Intel vPro Provisioning, 434476-001, Jun. 2006, Palo Alto, California.
Hewlett Packard Development Company, L.P., Setting up and configuring Intel AMT in HP Business Notebooks, Desktops, and Workstations, 742409-002, Sep. 2013, Palo Alto, California.
Hofemeier, Gael, Intel AMT: Strong ME Passwords are Required, Intel blog from web site, Nov. 8, 2007, Santa Clara, California.
Intel Corp., Configuration Guide for Intel vPro Technology with Microsoft ConfigMgr SP2, Version 2.0.1, May 2010, Santa Clara, California.
Intel Corp., How to vPro Remote config using SCCM???, Intel vPro Expert Center community blog, Apr. 22 to May 13, 2012, Santa Clara, California.
Intel Corp., Intel vPro Remote Configuration Domain Suffix Guide, Version 1.3, Mar. 17, 2011, Santa Clara, California.
Intel Corp., Intel vPro Technology—How to Purchase and Install GoDaddy Certificates for Intel AMT Remote Setup and Configuration, Sep. 19, 2012, Santa Clara, California.
Intel Corp., Intel vPro Technology Reference Guide, Revision 3.0, Mar. 2011, Santa Clara, California.
Intel Corp., Intel vPro Technology SMB & MSP Provisioning Method Selection Guide, Intel vPro Expert Center community blog, Aug. 20, 2009, Santa Clara, California.
Intel Corp., Remote Configuration—What is it? How does it work? When will it be available?, Intel vPro Expert Center community blog, Aug. 29, 2007 to Mar. 14, 2008, retrieved from Internet Archive Wayback Machine, Santa Clara, California.
Intel Corp., Simplifying the Provisioning Process, 319218-001US, Jan. 29, 2008, Santa Clara, California.
Kaseya International Ltd., Desktop Management—vPro Management, screen capture, downloaded Mar. 10, 2014, Waltham, Massachusetts.
Kaseya International Ltd., Desktop Policy Management, feature description from company web site, downloaded Mar. 10, 2014, Waltham, Massachusetts.
Kumar, Arvind, Purushottam Goel, and Ylian Saint-Hilare, Using Intel Active Management Technology (Intel AMT) in Small to Medium Business, excerpt from Active Platform Management Demystified: Unleashing the power of Intel vPro Technology, 2008, Intel Press, Hillsboro, Oregon.
Labtech LLC, Intel vPro Usage, 29B.51.155, Feb. 5, 2013, Tampa, Florida.
Labtech LLC, vPro beta as mentioned on FaceBook, forum post from web site, Jun. 22 to Nov. 10, 2011, Tampa, Florida.
Weaver, Charles, Kaseya Delivers Desktop Policy Management with Intel vPro, MSPAlliance blog, Jan. 9, 2012, Chico, California.
Wikipedia, the free encyclopedia, Out-of-band management, downloaded Mar. 10, 2014, San Francisco, California.

* cited by examiner

SYSTEMS AND METHODS FOR PROVISIONING, CONFIGURING, DIAGNOSING, AND MAINTAINING OUT-OF BAND MANAGEMENT OF COMPUTING DEVICES

CROSS-REFERENCE TO RELATED PATENT APPLICATIONS

This application claims priority under 35 U.S.C. § 119 of U.S. Provisional Patent Application No. 61/955,220, titled "SYSTEMS AND METHODS FOR PROVISIONING, CONFIGURING, DIAGNOSING, AND MAINTAINING OUT-OF-BAND MANAGEMENT OF COMPUTING DEVICES," and filed on Mar. 19, 2014, the entirety of which is hereby incorporated by reference.

FIELD OF THE DISCLOSURE

The present disclosure generally relates to out-of-band (OOB) management of computing devices, which is sometimes referred to as lights-out management (LOM) of computing devices. More specifically, the present disclosure relates to provisioning, configuring, diagnosing, or maintaining the infrastructure for providing out-of-band management of computing devices.

BACKGROUND OF THE DISCLOSURE

Out-of-band (OOB) management of computing devices may use an independent set of hardware dedicated to managing the computing devices. In this way, as long as the OOB hardware is operational, the OOB management system can manage the computing devices remotely, regardless of what state the managed devices are in.

SUMMARY OF THE DISCLOSURE

OOB management of computing devices can improve the service provided by a managed service provider (MSP) to its partners. OOB hardware and software can facilitate an MSP in remotely diagnosing and solving problems with devices even if they are powered off or not running, allowing the MSP to provide a faster and more accurate response with less cost. In cases where physical access to a computing device is difficult or impossible, OOB management can provide device maintenance.

The OOB management infrastructure can present a considerable security risk, since it essentially gives physical access to the device using a network. Therefore, the vendors of OOB management solutions pay careful attention to security issues. These products may require several levels of authentication to enable and may even require separate servers for provisioning them that run locally and contain site-specific shared secrets.

The vendors of OOB management solutions may want an OOB management product to work with a variety of computing devices, so the product may be designed with a variety of configuration parameters designed to facilitate using the product in many environments. This flexibility can make the OOB management product more complex to configure and use. In addition, some of the increased flexibility may come from the use of device-specific drivers that are installed on the device being managed. Keeping an inventory of these drivers and installing them on the managed devices can add further complexity to the process of configuring and maintaining the OOB management environment.

When a complex OOB management system fails to operate correctly, it may be challenging to identify the reason for the failure or diagnose and repair the system remotely.

The present disclosure can address many of the shortcomings of OOB management systems by facilitating the provisioning, configuration, diagnosis, and maintenance of OOB management of computing devices. As a result, the present disclosure may facilitate an MSP in providing better service at a lower cost to its partners.

At least one aspect of the present disclosure is directed to a system for provisioning an out-of-band system. The system includes a server of a first domain including a processor and memory. The system includes a management engine of the server that establishes a network tunnel with a device on a second domain different from the first domain, the network tunnel configured to route one or more communication ports of the device for provisioning. The management engine modifies, via a DHCP server on the second domain, the second domain to a modified domain including a fixed subdomain of the first domain, the fixed subdomain corresponding to a provisioning engine of the first domain. The provisioning engine receives, from the device via the network tunnel, responsive to the device obtaining the fixed subdomain of the first domain from the DHCP server, a provisioning request. The provisioning engine transmits, to the device via the network tunnel, a certificate configured with the first domain, the device configured to validate the certificate based on the certificate matching the modified domain obtained from the DHCP server. The management engine reverts, responsive to completion of a provisioning cycle by the device, the modified domain to the second domain.

In some embodiments, the server can be further configured to transmit a command to a module of the device to establish the network tunnel.

In some embodiments, the server can be further configured to provide, to the device, an address of the provisioning engine associated with the fixed subdomain of the first domain.

In some embodiments, the DHCP server can be further configured to receive, from the device, a DHCP request. The DHCP server can transmit, to the device responsive to the DHCP request, the first domain.

In some embodiments, the management engine can be further configured to terminate responsive to the completion of the provisioning cycle, the network tunnel.

In some embodiments, the management engine can be further configured to establish an Internet Protocol tunnel.

In some embodiments, the management engine can be further configured to use SSL to establish the network tunnel.

In some embodiments, the provisioning engine can be further configured to receive the certificate configured with the first domain from a vendor provisioning server on a third domain different from the first domain and the second domain.

In some embodiments, the management engine can be further configured to receive, from the device, a confirmation of provisioning.

In some embodiments, the device can be further configured to validate the provisioning engine responsive to the matching certificate.

Another aspect of the present disclosure is directed to a method of provisioning an out-of-band system. The method includes establishing, by a management engine of a server of a first domain, a network tunnel with a device on a second domain different from the first domain, the network tunnel configured to route one or more communication ports of the device for provisioning. The method includes modifying, by the management engine, via a DHCP server on the second domain, the second domain to a modified domain including a fixed subdomain of the first domain, the fixed subdomain corresponding to a provisioning engine of the first domain. The method includes receiving, by the provisioning engine from the device via the network tunnel, responsive to the device obtaining the fixed subdomain of the first domain from the DHCP server, a provisioning request. The method includes transmitting, by the provisioning engine to the device via the network tunnel, a certificate configured with the first domain, the device configured to validate the certificate based on the certificate matching the modified domain obtained from the DHCP server. The method includes reverting, by the management engine, responsive to completion of a provisioning cycle by the device, the modified domain to the second domain.

Yet another aspect of the present disclosure is directed to a non-transitory computer readable medium storing instructions that, when executed by one or more processors, facilitate provisioning an out-of-band system. The instructions include instructions to establish, by a management engine of the server, a network tunnel with a device on a second domain different from the first domain, the network tunnel configured to route one or more communication ports of the device for provisioning. The instructions include instructions to modify, by the management engine, via a DHCP server on the second domain, the second domain to a modified domain including a fixed subdomain of the first domain, the fixed subdomain corresponding to a provisioning engine of the first domain. The instructions include instructions to receive, by the provisioning engine from the device via the network tunnel, responsive to the device obtaining the fixed subdomain of the first domain from the DHCP server, a provisioning request. The instructions include instructions to transmit, by the provisioning engine to the device via the network tunnel, a certificate configured with the first domain, the device configured to validate the certificate based on the certificate matching the modified domain obtained from the DHCP server. The instructions include instructions to revert, by the management engine, responsive to completion of a provisioning cycle by the device, the modified domain to the second domain.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1A:
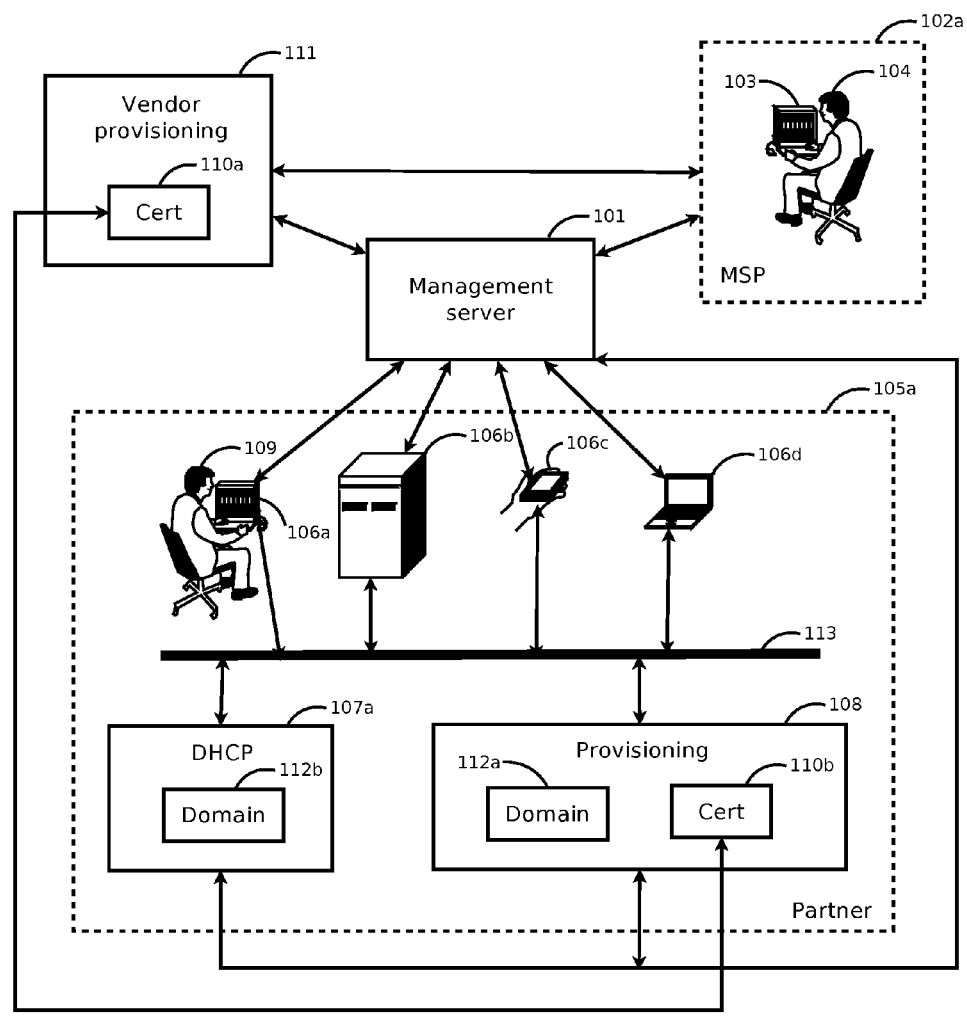
FIG. 1A is an illustrative block diagram of an embodiment of an overview of a system for provisioning, configuring, diagnosing, and maintaining out-of-band management of computing devices.

An MSP can use a management server to service the devices of its partners. The management server can facilitate the provisioning of OOB management hardware of the devices. The management server can interact with a vendor provisioning server to generate the certificates used to provision the OOB management hardware. The management server can also set up a partner provisioning server or an MSP provisioning server to use the certificates to correctly provision the OOB management hardware. The use of an MSP provisioning server can facilitate reducing or eliminating the complexity of managing the partner provisioning servers.

The management server can also facilitate in diagnosing problems in the configuration of the OOB management hardware of devices. The management server can read status and diagnostic information from the OOB management hardware and apply diagnosis rules to the information to generate likely diagnoses and solutions for problems, and then display the diagnoses and solutions to a technician in a display that may be convenient and easy to use.

The management server can facilitate the installation of support drivers on devices to improve performance and enable advanced features on the OOB management hardware for those devices. The management server can read configuration and status information for both the devices and their OOB management hardware, and format search strings that can be used with a search engine to find likely candidates for the drivers. A technician can identify the proper drivers, and the management server can automate the installation of those drivers on the appropriate devices.

The management server can facilitate the configuration of OOB management hardware of devices by representing the constraints on the configuration as a set of rules, and validating proposed configurations against those rules before applying them to the OOB management hardware. This can facilitate a technician in understanding the interactions between configuration parameters, and facilitate preventing the OOB management hardware from acting inconsistently or being disabled by incorrect parameter configurations.

The management server can facilitate the provisioning of OOB management hardware of devices by using a single MSP provisioning server with one certificate, and modifying a network tunnel and the local dynamic host control protocol (DHCP) server at a partner site to use the MSP provisioning server to provision the OOB management hardware of devices at the site. This can eliminate the cost of setting up provisioning servers at every site, and can also eliminate the delay in setting up those servers and acquiring certificates for them. The use of an MSP provisioning server can facilitate reducing or eliminating the complexity of managing provisioning servers at the partner sites.

The management server can facilitate provisioning OOB management hardware of new devices that are added at partner sites, thereby reducing or eliminating the need for the MSP to constantly monitor the addition of new devices at partner sites. This can facilitate the remote access to new devices to provide service.

FIG. 1A is an illustrative block diagram of an embodiment of an overview of a system for provisioning, configuring, diagnosing, and maintaining out-of-band management of computing devices. A managed service provider (MSP) 102a can use a management server 101 to provision, configure, diagnose, and maintain the out-of-band (OOB) infrastructure for a set of devices 106a-106d at a partner site 105a. A technician 104 at the MSP can use a device 103 as a convenient interface to the management server 101. End users such as 109 at the partner site 105a may benefit from the OOB management of their devices 106a-106d, since the remote access afforded by the OOB management may help the MSP 102a to reduce the cost, reduce the response time, and improve the accuracy and efficiency of servicing the devices 106a-106d.

The implementation of the OOB management functions may include the use of a vendor provisioning server 111 that may be accessed directly by the technician 104 using a device 103. The vendor provisioning server 111 may create a certificate 110a. At the partner site 105a, the devices 106a-106d may access a dynamic host control protocol (DHCP) server 107a, and a provisioning server 108. The DHCP server 107a may provide the devices 106a-106d with network operating parameters during the initialization or power-on sequence of the devices 106a-106d. The network operating parameters provided to the devices 106a-106d may include, for example, internet protocol (IP) addresses, IP subnet masks, IP addresses for routing gateways, IP addresses for domain name service (DNS) servers, IP addresses for routers, IP addresses for time servers, IP addresses for log servers, IP addresses for cookie servers, IP addresses for line printer remote (LPR) servers, IP addresses for Impress servers, IP addresses for resource location servers, host names, boot file sizes, dump file names, domain names, IP addresses for swap servers, root path names, and extension path names. The DHCP server 107a may have a domain 112b stored in order to facilitate providing the network operating parameters. The provisioning server 108 can provide the OOB hardware for the devices 106a-106d with OOB configuration parameters. The provisioning server 108 may have a domain 112a and a certificate 110b stored in order to facilitate providing the OOB configuration parameters. The domain 112a may be the same as the domain 112b. The certificate 110b may be the same as the certificate 110a.

The devices 106a-106d and the OOB hardware for them may communicate with the management server 101 using a network. The devices 106a-106d and the OOB hardware for them may communicate with the DHCP server 107a and provisioning server 108 using a network. The DHCP server 107a and provisioning server 108 may communicate with the management server 101 using a network.

The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

In some embodiments, the one or more servers associated with the management server 101, vendor provisioning server 111, DHCP server 107a, MSP provisioning server 602, or provisioning server 108 may not be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The system and its components, such as a management server 101, vendor provisioning server 111, DHCP server 107a, provisioning server 108, devices 106a-106f, the OOB hardware for the devices 106a-106f, MSP provisioning server 602, and MSP device 103, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as a management server 101, vendor provisioning server 111, DHCP server 107a, provisioning server 108, devices 106a-106f, the OOB hardware for the devices 106a-106f, MSP provisioning server 602, and MSP device 103, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 1B:
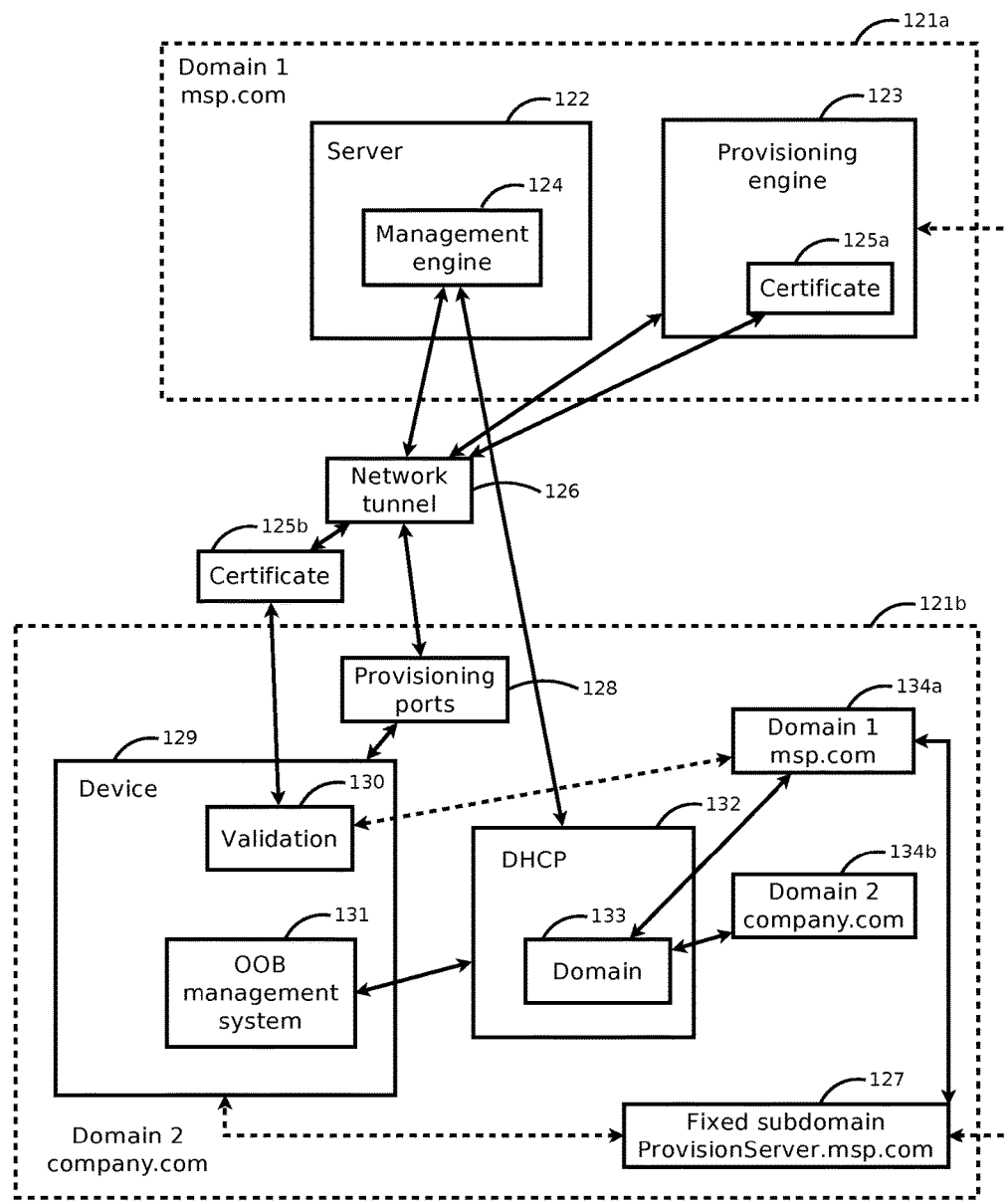
FIG. 1B is an illustrative block diagram of an embodiment of a system for provisioning an out-of-band system.

FIG. 1B is an illustrative block diagram of an embodiment of a system for provisioning an out-of-band system. Two distinct domains 121a and 121b can be represented by two different domain names. In the example embodiment of FIG. 1B, the domain 121a can be represented by the domain name "msp.com" and the domain 121b can be represented by the domain name "company.com". For example, the first domain can belong to a managed service provider (MSP) whose business is to outsource information technology support for its customers. Continuing the example, the second domain can belong to one of the customers of the MSP and can include the devices of the customer. The first domain can include a server 122 that can include a management engine 124. The management engine 124 can be used to monitor, configure, and manage customer devices such as device 129 in domain 121b. The management engine 124 may use an agent on a device under management such as device 129, and may communicate with the agent in order to complete the functions required for monitoring, configuring, and managing the device 129. The communication from the management engine 124 to the device 129 may include commands sent to the device 129 indicating functions to be completed, such as changing an application configuration, changing a system configuration, running a program, deleting a file, transferring a file, testing a network connection, installing an application, sending an email, and so on. The communication from the device 129 to the management engine 124 may include status information, files, configuration settings, network scans, user status, and so on.

The management engine can establish a network tunnel 126 between the domain 121a and the domain 121b. In this way, the devices in domain 121b such as device 129 can access devices in domain 121a as if they were on a local network in domain 121b. For example, the tunnel can be a virtual private network (VPN), an SSH tunnel, a proprietary implementation, or any other type of tunnel. The management engine 124 can set up the tunnel using devices in domain 121a, devices in 121b, devices in neither domain, or devices in both domains. The management engine 124 may use existing devices to implement the tunnel, or may use a dedicated device that is designed to implement the tunnel. The management engine 124 may configure the network tunnel 126 to communicate traffic from the device 129 that uses a set of provisioning ports 128 that are used to provision an out-of-band (OOB) management system 131 that can be part of the device 129.

The domain 121b can include a dynamic host control protocol (DHCP) server 132 that can include a domain 133 that it serves to local devices to provide the devices with the name of the domain 133. In the example embodiment of FIG. 1B, the domain 133 may be set to the domain name "company.com" 134b that is normally associated with the domain 121b. The management engine 124 can modify the DHCP server 132 by modifying the domain 133 to represent a different domain. In the example embodiment of FIG. 1B, the management engine 124 can modify the domain 133 from the value "company.com" 134b to a new value of "msp.com" 134a. This domain 134a can include subdomains, and may include a fixed subdomain 127 with the name "ProvisionServer". In the example embodiment of FIG. 1B, the new or modified domain 133 can include the subdomain "ProvisionServer.msp.com" 127. This subdomain 127 can point to a provisioning engine 123 in domain 121a, as indicated by the dotted line.

As part of its initial provisioning, the OOB management system 131 on the device 129 may use the DHCP server 132 to access the local domain 133, and may retrieve the modified domain name 134a. The device 129 and its OOB management system 131 may use a fixed subdomain 127 to access the provisioning engine 123 to set up the OOB management system 131. As a result, the OOB management system 131 may transmit a provisioning request to the provisioning engine 123 through the network tunnel 126. The provisioning engine may respond by transmitting a certificate 125a back to the device 129 through the network tunnel 126, and the device may store the certificate 125b locally.

The device 129 may use a validation 130 to verify that the certificate 125b is legitimate, which may indicate that the device 129 and the OOB management system 131 can trust that the provisioning engine 123 is legitimate and should be used to provision the OOB management system 131. The validation 130 may be accomplished by comparing the domain name in the certificate 125b with the domain name 134a from the DHCP server 132. As a result of the configuration of the DHCP server 132 by the management engine 124, the validation 130 may succeed.

Once the OOB management system 131 completes its provisioning, the management engine 124 can modify the domain 133 of the DHCP server 132 to revert it back from the domain 134a to the original domain 134b, completing the process.

Figure 2:
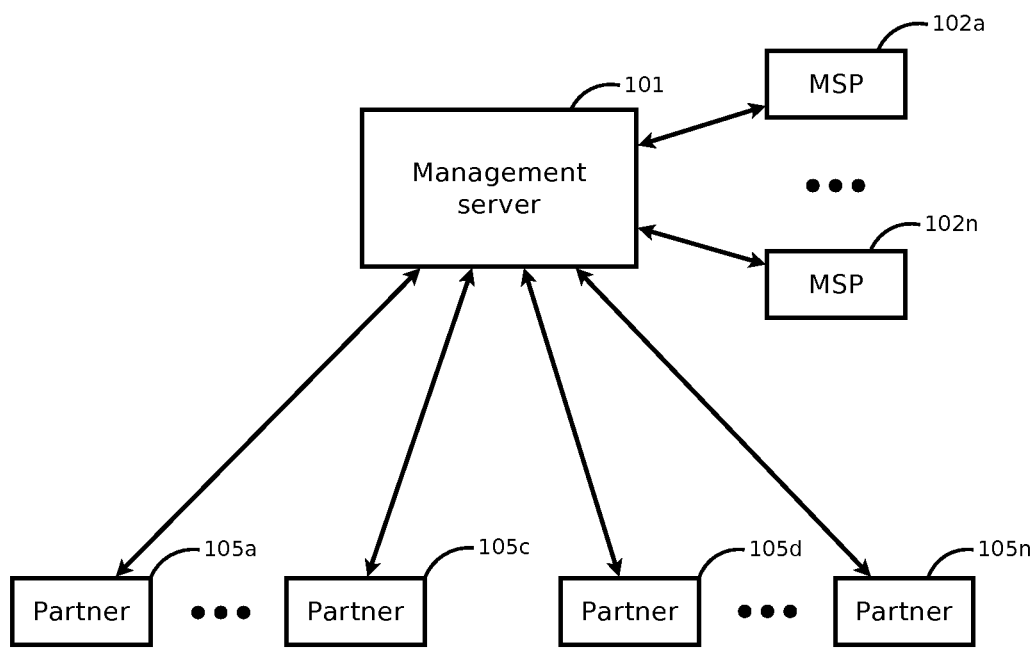
FIG. 2 is an illustrative block diagram of an embodiment of a system used by multiple service providers to service multiple partners.

FIG. 2 is an illustrative block diagram of an embodiment of a system used by multiple managed service providers (MSPs) to service multiple partners. A plurality of MSPs 102a-102n may use a management server 101 to service a plurality of partners 105a-105n. The MSPs 102a-102n may service subsets of the partners 105a-105n. By way of example, in FIG. 2, MSP 102a may service partners 105a-105c, and MSP 102n may service partners 105d-105n.

Figure 3:
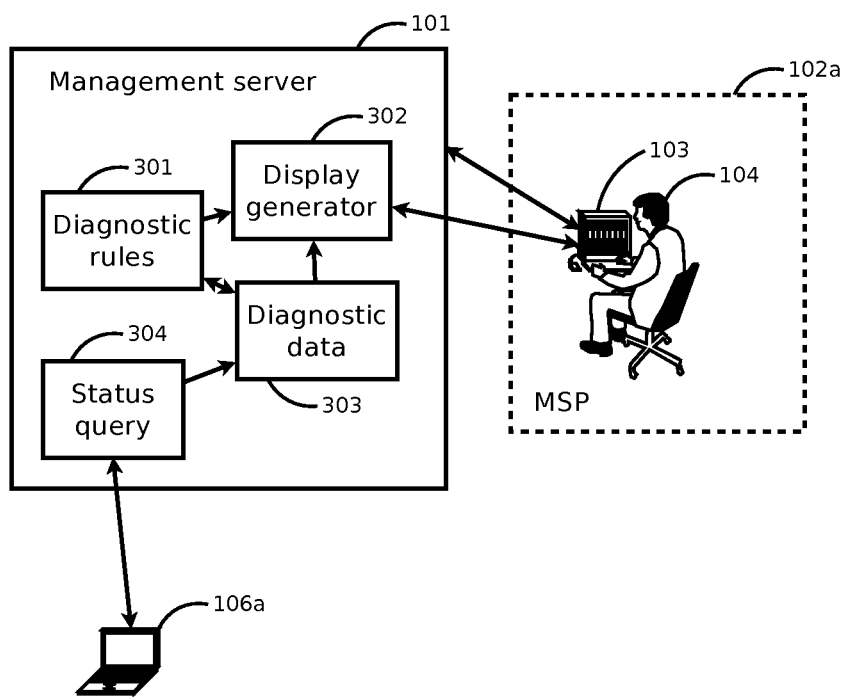
FIG. 3 is an illustrative block diagram of an embodiment of a system for diagnosing and providing failure analysis of out-of-band management of computing devices.

FIG. 3 is an illustrative block diagram of an embodiment of a system for diagnosing and providing failure analysis of out-of-band management of computing devices. The management server 101 can have a display generator module 302, a diagnosis rules module 301, a set of diagnostic data 303, and a status query module 304. As previously described with respect to FIG. 1, a technician 104 at an MSP 102a can use a device 103 to access the management server 101. The management server 101 may use the status query module 304 to access diagnostic information of the OOB hardware for the device 106a and store it in the diagnostic data 303. The management server 101 can use the diagnosis rules module 301 to analyze the diagnostic data 303 and determine a diagnosis for any unusual conditions in the OOB hardware for the device 106a. The display generator module 302 can format the diagnostic data 303, along with the diagnosis from the diagnosis rules module 301 for presentation to the technician 104.

Figure 4:
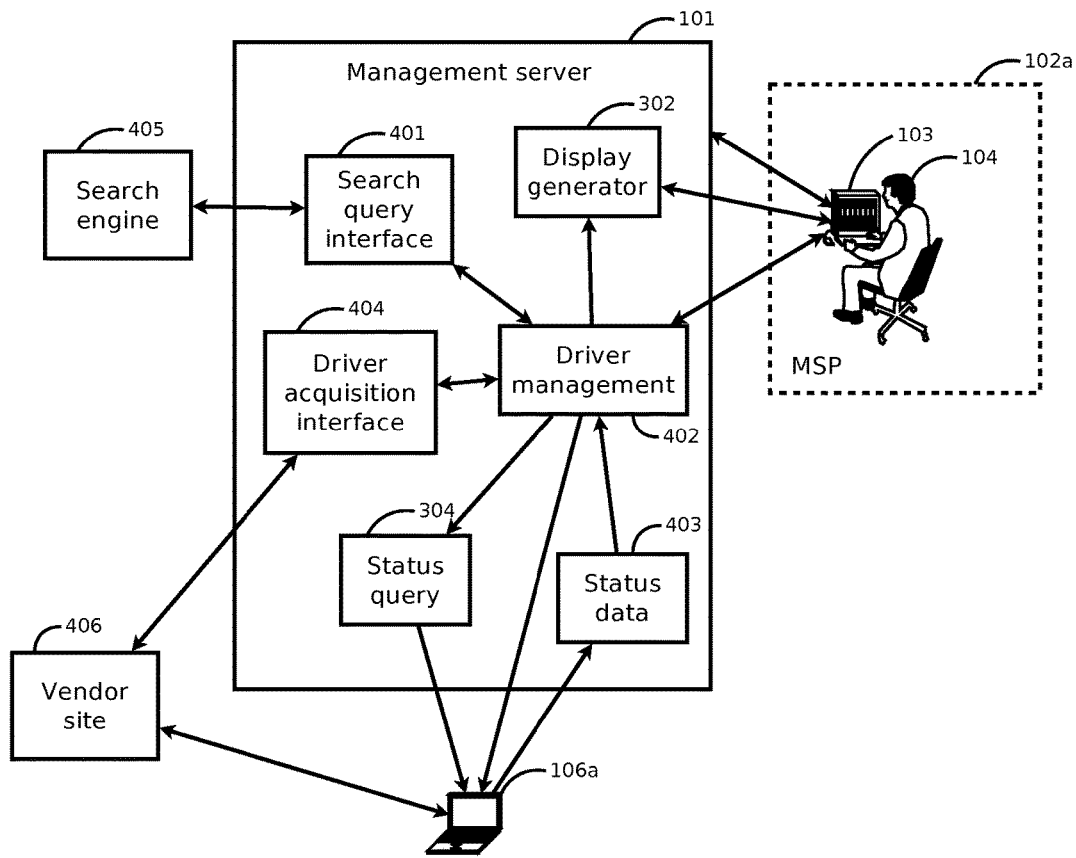
FIG. 4 is an illustrative block diagram of an embodiment of a system for facilitating the selection and provisioning of drivers for out-of-band management of computing devices.

FIG. 4 is an illustrative block diagram of an embodiment of a system for facilitating the selection and provisioning of drivers for out-of-band management of computing devices. The management server 101 can have a display generator module 302, a status query module 304, a search query interface module 401, a driver management module 402, a set of status data 403, and a driver acquisition interface module 404. As previously described with respect to FIG. 1, a technician 104 at an MSP 102a can use a device 103 to access the management server 101. The search query interface module 401 can initiate a search on a search engine 405 and receive results from the search. The driver acquisition interface 404 can connect to a vendor site 406. The driver management module 402 may use the status query module 304 to access status information of the OOB hardware for the device 106a and store it in the status data 403. The driver management module 402 can use the status data 403 to determine if the device 106a needs to install a driver to fully utilize the OOB hardware. The driver management module 402 may not have a copy of the required driver, and may not have sufficient information to determine the location for finding the required driver. The driver management module 402 may be able to use information in the status data 403 to construct a search query that is likely to find the required driver. By way of example, in FIG. 4, the status data 403 may contain information that the device 106a is an ELITEBOOK laptop, model number 8740W, manufactured by HEWLETT PACKARD COMPANY, running the WINDOWS 7 operating system by MICROSOFT CORPORATION, and that the OOB hardware for the device 106a is the VPRO system manufactured by INTEL CORPORATION. The driver management module 402 may use this information to construct the search query "site:hp.com elitebook 8740w intel management engine interface windows 7". The driver management module 402 can use the search query interface 401 to send the search query to a search engine 405, receive the result, and transmit the result to the display generator 302. The display generator 302 can format the result and present it to the technician 104. The technician can inspect the result and use it to select the proper driver for the device 106a. The driver management module 402 can indicate this selection to the driver acquisition interface module 404, which can in turn access the driver from the vendor site 406. The driver management module 402 can either initiate the installation of the driver directly from the vendor site 406 to the device 106a, or can manage the installation of the driver from the driver management module 402 onto the device 106a. The driver management module 402 can indicate the result of the installation to the display generator 302, which can in turn update the status information about the driver on the device 106a for the technician 104.

Figure 5:
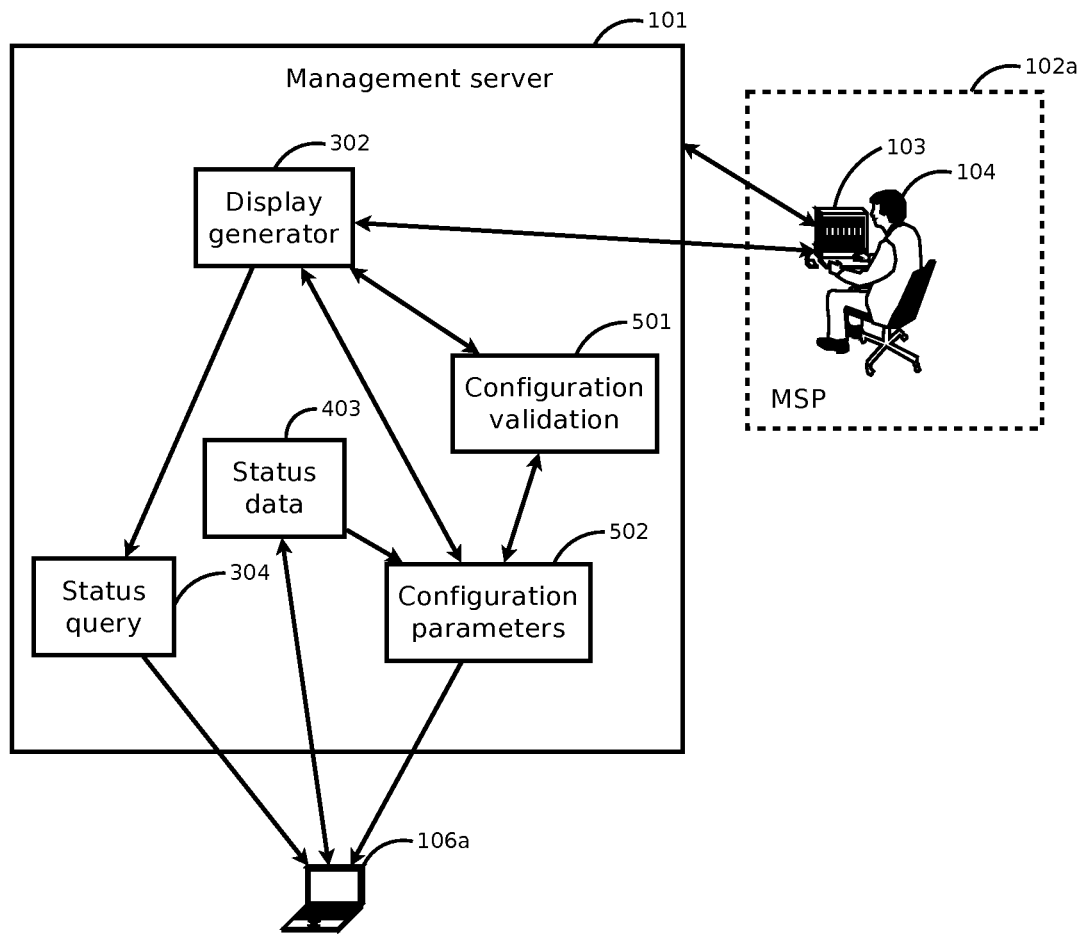
FIG. 5 is an illustrative block diagram of an embodiment of a system for facilitating the validation of configuration information for out-of-band management of computing devices.

FIG. 5 is an illustrative block diagram of an embodiment of a system for facilitating the validation of configuration information for out-of-band management of computing devices. The management server 101 can have a display generator module 302, a status query module 304, a set of status data 403, a configuration validation module 501, and a set of configuration parameters 502. As previously described with respect to FIG. 1, a technician 104 at an MSP 102a can use a device 103 to access the management server 101. The management server 101 may use the status query module 304 to access status information of the OOB hardware for the device 106a and store it in the status data 403. The status data 403 can be used to determine configuration parameters 502 of the OOB hardware, which can be transmitted to the display generator 302, which can in turn format these configuration parameters 502 for display to the technician 104. The technician 104 may want to make some changes to the configuration parameters 502 for the OOB hardware, but the exact format of the configuration parameters 502, and interactions between different configuration parameters 502, may be complex. This complexity may cause the technician 104 to make mistakes in changing the configuration parameters 502. The result of the mistakes may be that the OOB hardware for device 106a may silently reject the changes to the configuration parameters 502, or the changes may cause incorrect operation or failure of the OOB hardware. To facilitate the technician in making correct changes to the configuration parameters 502, the configuration validation module 501 can check the proposed changes to the configuration parameters 502 to ensure that the complex rules are satisfied, and if any problems are discovered, they can be transmitted to the display generator 302 to notify the technician 104 of the issues in an easily understandable format. The technician can correct any issues, and when the configuration validation module 501 determines that the new configuration parameters 502 are consistent and correct, the configuration parameters 502 can be used to update the OOB hardware for the device 106a.

Figure 6:
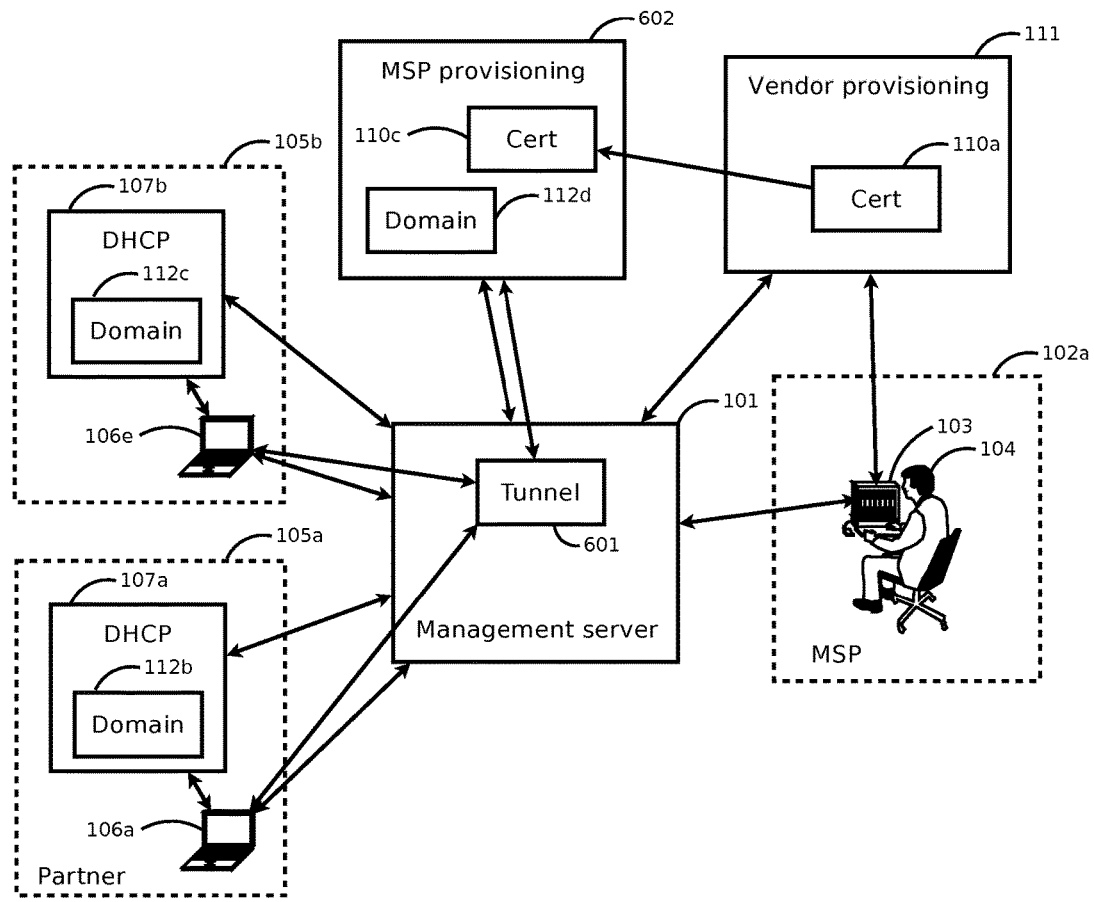
FIG. 6 is an illustrative block diagram of an embodiment of a system for automatically provisioning out-of-band management of computing devices.

FIG. 6 is an illustrative block diagram of an embodiment of a system for automatically provisioning out-of-band management of computing devices. The vendor provisioning server 111 may require a different certificate for each partner domain 112b-112c. This may be inconvenient for the MSP 102a, because generating a certificate for each partner 105a-105b at the vendor provisioning server 111 may be expensive or time-consuming, and using multiple certificates may require installing a provisioning server at each partner 105a-105b, which may also be expensive or time-consuming. The MSP 102a may therefore desire to use a single certificate and a single provisioning server for the provisioning of OOB hardware at multiple partners 105a-105b. FIG. 6 illustrates an embodiment of a system to use a single certificate 110c and a single MSP provisioning server 602 for provisioning OOB hardware at all partners 105a-105b. The technician 104 at the MSP 102a can use the vendor provisioning server 111 to create a certificate 110a for a single domain 112d stored on an MSP provisioning server 602 that is under the control of the MSP 102a. A copy of the certificate 110c for the domain 112d can be installed on the MSP provisioning server 602. The management server 101 can set up an IP tunnel 601 that transfers IP traffic between the partners 105a-105b and the MSP provisioning server 602 in such a way that the MSP provisioning server 602 appears to be part of the local network, independently, at each partner 105a-105b. The management server 101 can temporarily modify the configuration of the DHCP server 107a at the partner site 105a so that the DHCP server 107a uses the value of the MSP provisioning domain 112d for the domain 112b when it transmits the domain 112b to the device 106a during the device initialization. The management server 101 can then start the initialization of the device 106a, which then uses the domain 112d from the DHCP server 107a. Device 106a can communicate through the tunnel 601 with the MSP provisioning server 602, and the domain 112d may properly match the certificate 110c on the MSP provisioning server 602, so the OOB hardware for device 106a can be provisioned properly. Once the device 106a and its associated OOB hardware report a successful provisioning operation to the management server 101, the management server 101 can configure the DHCP server 107a to revert to using the partner domain 112b for configuring the device 106a. In a manner like that just described, the management server 101 can use the tunnel 601, the MSP provisioning server 602, and the DHCP server 107b to correctly provision the OOB hardware for the device 106e at partner site 105b. In this way, the MSP 102a can use a single certificate 110c to provision OOB hardware at multiple partners 105a-105b with a single MSP provisioning server 602. The MSP provisioning server 602 can facilitate reducing or eliminating the complexity of managing the provisioning servers at the partners 105a-105b.

Figure 7:
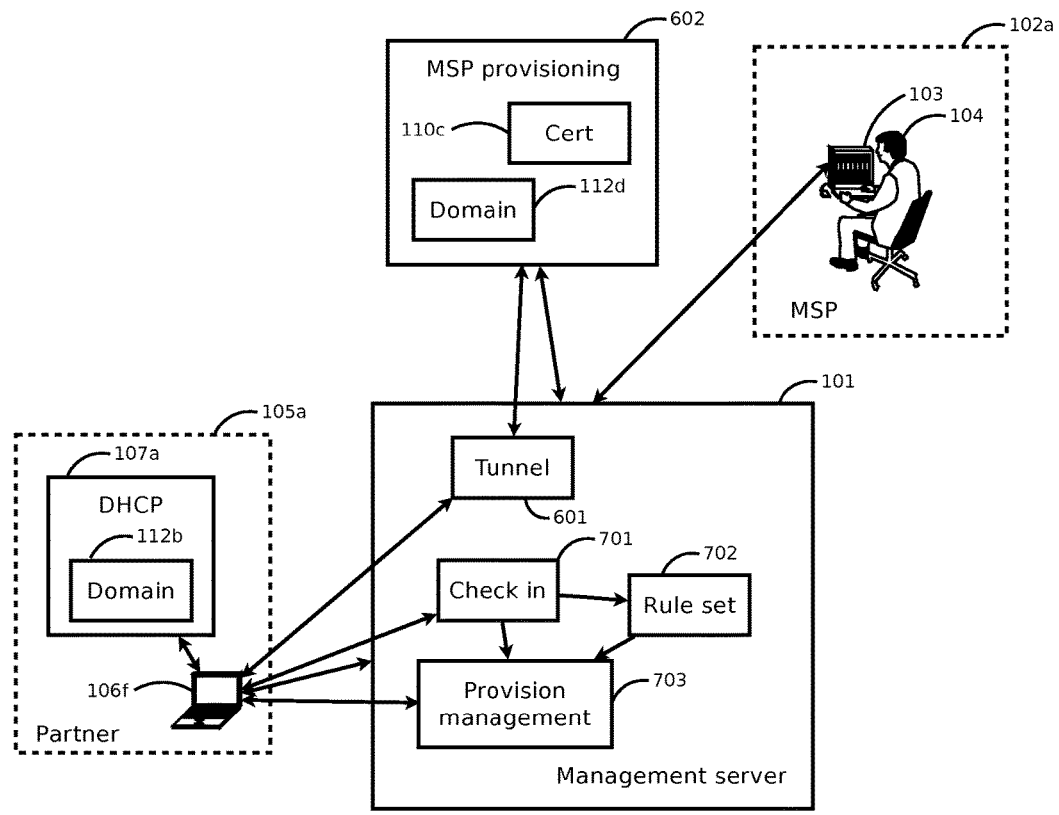
FIG. 7 is an illustrative block diagram of an embodiment of a system for using a rule set to automatically provision out-of-band management of computing devices.

FIG. 7 is an illustrative block diagram of an embodiment of a system for using a rule set to automatically provision out-of-band management of computing devices. As previously described with respect to FIG. 1, a technician 104 at an MSP 102a can use a device 103 to access the management server 101. The management server 101 can be set up to detect the presence of a new device 106f that is not currently being managed. This can happen, for example, when the partner 105a buys a new device 106f. It can also happen, for example, when the MSP 102a first begins to manage devices such as 106f for the partner 105a, and some or all devices such as 106f are brought under management. When a new device such as 106f is detected by the management server 101, the new device 106f may communicate with a check in module 701 to set up the management. The check in module 701 can transmit information about the new device 106f to a rule set 702. If the rule set 702 determines that the new device 106f should be provisioned for OOB management, the rule set 702 can signal a provision management module 703, which can in turn use information from the check in module 701 to initiate the automatic provisioning of OOB as previously described with reference to FIG. 6. The provision management module 703 can use a tunnel 601, an MSP provisioning server 602 with a certificate 110c that matches a domain 112d, and a DHCP server 107a with a provisioning domain 112b to provision OOB automatically on the OOB hardware for the new device 106f.

Figure 8:
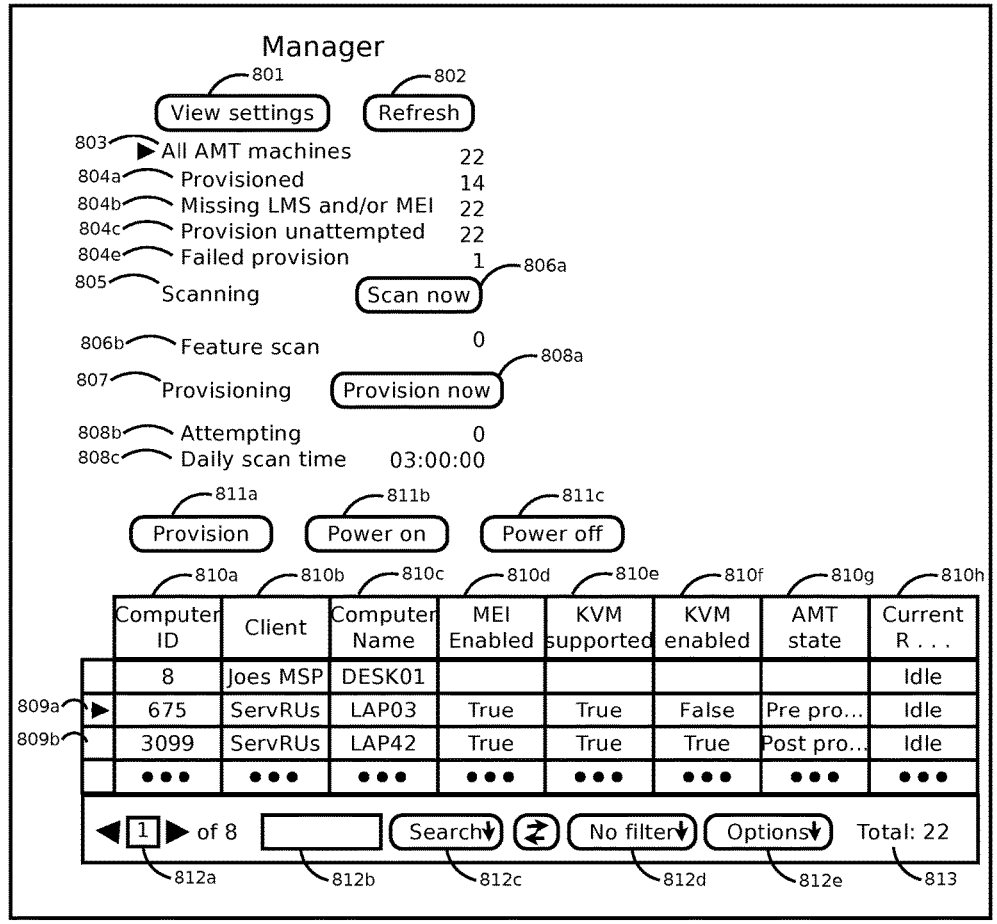
FIG. 8 is an illustrative example of an embodiment of a user interface for managing computing devices using out-of-band management.

FIG. 8 is an illustrative example of an embodiment of a user interface for managing computing devices using out-of-band management. The user interface can have a section that provides controls and displays summary information. The view settings control 801 can be selected to show and modify settings that control the OOB management functions. The refresh control 802 can be selected to update the summary display counts with information that has changed since the display was initially generated. The information summary section 803 can display summary counts of the devices 106a-106f with OOB management, for example, the count 804a of devices 106a-106f that are provisioned, the count 804b of devices 106a-106f that are missing drivers, the count 804c of devices 106a-106f that can be provisioned but have not yet been attempted, and the count 804d of devices 106a-106f that have been attempted and failed to provision. The scanning section 805 can provide a scan now control 806a that can be selected to run a scan on all available devices 106a-106f to actively determine their OOB provisioning status, and can show the count 806b of devices 106a-106f that were successfully scanned. The provisioning section 807 can provide a provision now control 808a that can initiate automatic provisioning, as previously described with respect to FIG. 6 and FIG. 7, for all devices 106a-106f that are available for provisioning, and can display a count 808b of devices 106a-106f that are available for provisioning and the time 808c when the automatic provisioning will next be run. The user interface in FIG. 8 can have a section that displays information about the devices 106a-106f known to the management system 101 in tabular form, with rows like 809a and 809b corresponding to different devices 106a-106f, and columns 810a-810h corresponding to information about those devices 106a-106f. In the example of FIG. 8, row 809a has been selected for further action, and row 809b remains unselected. Column 810a can show the internal identifier for referencing the devices 106a-106f. Column 810b can show the partner 105a-105n where the devices 106a-106f are located. Column 801c can show the names of the devices 106a-106f. Column 810d can show whether or not a driver is installed on the devices 106a-106f. Column 810e can show whether or not the hardware of the devices 106a-106f can support a remote control session, which may be referred to as keyboard/video/mouse (KVM) functionality. Column 810f can show whether or not the OOB hardware for the devices 106a-106f is enabled to support KVM functionality. Column 810g can show the current state of the provisioning of the OOB hardware for the devices 106a-106f. Column 810h can show the current state of the OOB hardware for the devices 106a-106f. Once a row is selected, such as row 809a, the controls 811a-811c can be used to initiate a specific action on the device (one of 106a-106f) associated with the selected row 809a. The provision control 811a can be used to initiate an automatic provisioning operation on the device (one of 106a-106f), as previously described with respect to FIG. 6. The power on control 811b can be used to turn on the selected device (one of 106a-106f). The power off control 811c can be used to turn off the selected device (one of 106a-106f). The paging control 812a can be used to move between multiple pages of tabular data. The search text control 812b can be used to specify items to find in the tabular data. The search control 812c can be selected to run the search specified by the search text control 812b. The filter pulldown control 812d can be used to apply pre-defined filters to select a subset of information shown in the tabular display. The options control 812e can be used to set options that control the format of the display of the tabular data. The count 813 can indicate how many rows corresponding to devices 106a-106f are selected for display using the search controls 812b and 812c and the filter control 812d.

Figure 9:
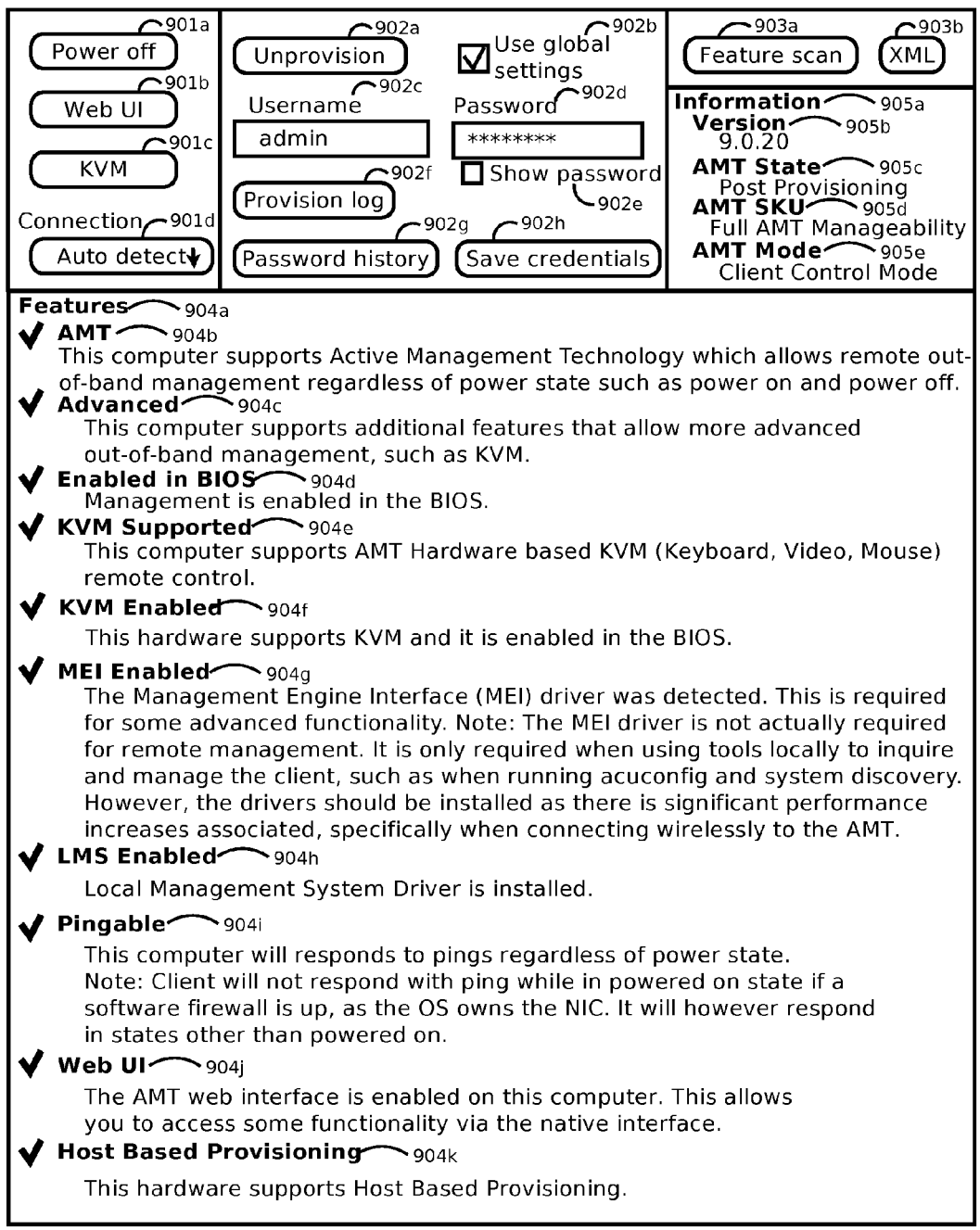
FIG. 9 is an illustrative example of an embodiment of a user interface for displaying the status of and controlling actions on a device being managed using out-of-band management.

FIG. 9 is an illustrative example of an embodiment of a user interface for displaying the status of and controlling actions on a device being managed using out-of-band management. A set of controls 901a-901d can be used to manage overall aspects of remote control of the device (one of 106a-106f). The power toggle button 901a can turn on and off the power on the device (one of 106a-106f). To make the operation clear, the button 901a can be labeled with the action it will take, in other words, the button 901a can be labeled "Power on" if the power is off on the device (one of 106a-106f), and it can be labeled "Power off" if the power is on. The web UI button 901b can start the web-based interface on the OOB hardware for the device (one of 106a-106f), and can also start a web browser window configured to communicate with the web-based interface. The KVM button 901c can start the remote-control keyboard/video/mouse (KVM) function of the OOB hardware for the device (one of 106a-106f), and can also start a client for communicating with the KVM function. The connection setting 901d can select the style of communication used for controlling the OOB hardware for the device (one of 106a-106f).

A set of controls 902a-902h can be used to manage the provisioning of the OOB hardware for the device (one of 106a-106f). The provisioning toggle button 902a can enable and disable the provisioning of the OOB hardware for the device (one of 106a-106f). To make the operation clear, the button 902a can be labeled with the action it will take, in other words, the button 902a can be labeled "Provision" if the OOB hardware for the device (one of 106a-106f) is unprovisioned, and it can be labeled "Unprovision" if the OOB hardware for the device (one of 106a-106f) is provisioned. The global settings checkbox 902b can select whether to use global settings for the device (one of 106a-106f) or to enable device-specific settings that can be adjusted using controls 902c-902h. The username text entry control 902c can be used to set the username required to access the OOB management functions on the device (one of 106a-106f). The password text entry control 902d can be used to set the password required to access the OOB management functions on the device (one of 106a-106f). The show password checkbox control 902e can control whether the password in the password text entry control 902d is hidden or displayed while typing it. The provision log control 902f can be selected to show a display that lists a history of all the provisioning operations on the device (one of 106a-106f). The password history control 902g can be selected to show a display that lists a history of all the password change operations on the device (one of 106a-106f). The save credentials control 902h can be selected to set the username from control 902c and the password from control 902d as the username and password required to access the OOB management functions on the device (one of 106a-106f).

A set of controls 903a-903b can be used to manage the display of status information about the OOB hardware for the device (one of 106a-106f). The feature scan button 903a can be selected to initiate a scan of the OOB hardware for the device (one of 106a-106f) to update the display from the actual settings on the device (one of 106a-106f). The show XML toggle button 903b can be selected to show or hide a display of the raw XML text information sent back from the device (one of 106a-106f) listing the details of the settings.

A status display can show the features 904a of the OOB hardware for the device (one of 106a-106f), and can also show status information 905a about the OOB hardware for the device (one of 106a-106f). The Active Management Technology (AMT) setting 904b can indicate whether or not the device (one of 106a-106f) has OOB management hardware and functionality. The advanced setting 904c can indicate whether or not the OOB management for the device (one of 106a-106f) supports additional features such as remote KVM management. The enabled in BIOS setting 904d can indicate whether or not the OOB management functions are enabled on the device (one of 106a-106f). The KVM supported setting 904e can indicate whether the OOB hardware for the device (one of 106a-106f) supports remote KVM management. The KVM enabled setting 904f can indicate whether remote KVM management is enabled for the device (one of 106a-106f). The Management Engine Interface (MEI) enabled setting 904g can indicate whether a driver is installed on the device (one of 106a-106f) to improve OOB performance. The Local Management System (LMS) enabled setting 904h can indicate whether a driver is installed on the device (one of 106a-106f) to improve OOB functionality. The pingable setting 904i can indicate whether the OOB hardware network interface will respond to an internet control message protocol (ICMP) ping message request. The web UI setting 904j can indicate whether the OOB management interface is enabled to allow control through an interface using a web browser. The host based provisioning setting 904k can indicate whether or not the OOB hardware for the device (one of 106a-106f) can be provisioned remotely, for example, as described with reference to FIG. 6. The version setting 905b can indicate the version number of the OOB hardware and software for the device (one of 106a-106f). The state setting 905c can indicate the state of the provisioning of the OOB hardware for the device (one of 106a-106f). The stock keeping unit (SKU) setting 905d can indicate the product name of the OOB hardware for the device (one of 106a-106f). The mode setting 905e can indicate a sub-state of the provisioning of the OOB hardware for the device (one of 106a-106f).

Figure 10:
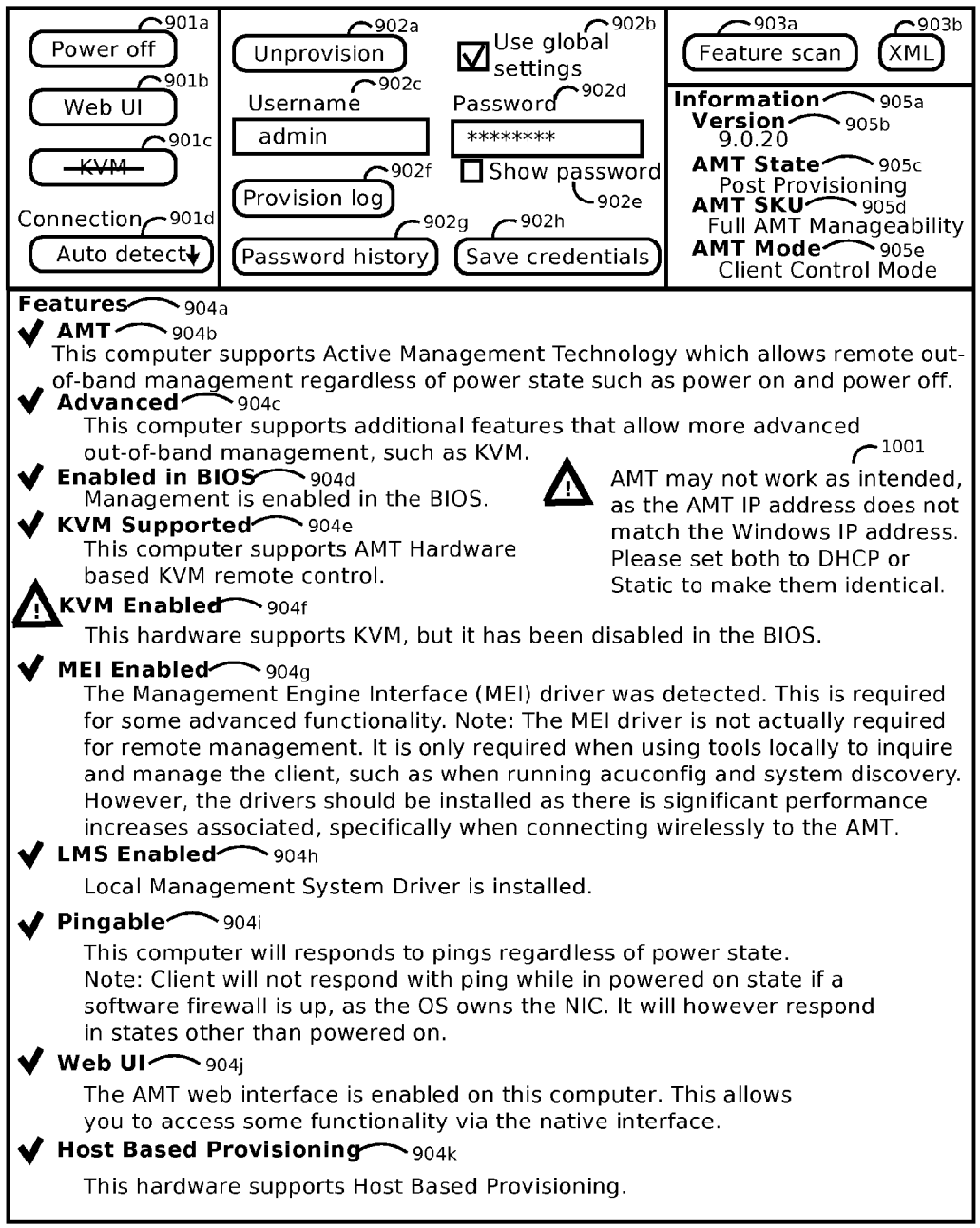
FIG. 10 is an illustrative example of an embodiment of a user interface for displaying the status of and controlling actions on a device being managed using out-of-band management that is not completely configured.

FIG. 10 is an illustrative example of an embodiment of a user interface for displaying the status of and controlling actions on a device being managed using out-of-band management that is not completely configured. Most of the controls and settings in FIG. 10 are the same as those illustrated earlier with respect to FIG. 9, so in the interest of clarity, this description of FIG. 10 illustrates the differences from FIG. 9. The KVM enabled setting 904f may be shown as disabled, indicating that remote KVM management is not available. As a result, the KVM button control 901c may be gray and disabled, because it cannot be used to initiate a remote KVM management session. The very visible changes to 904f and 901c can facilitate immediate understanding of the situation. In addition, the diagnostic display 1001 may show a verbose description of the symptom, a description of the underlying problem, and a suggestion for fixing the problem. In the example of FIG. 10, the diagnostic display 1001 can indicate that the remote KVM functionality of the OOB hardware will not work because the IP address of the OOB hardware does not match the IP address of the device interface, and that this situation may be caused by a mismatch of the address configuration settings of the OOB hardware and the device interface.

Figure 11:
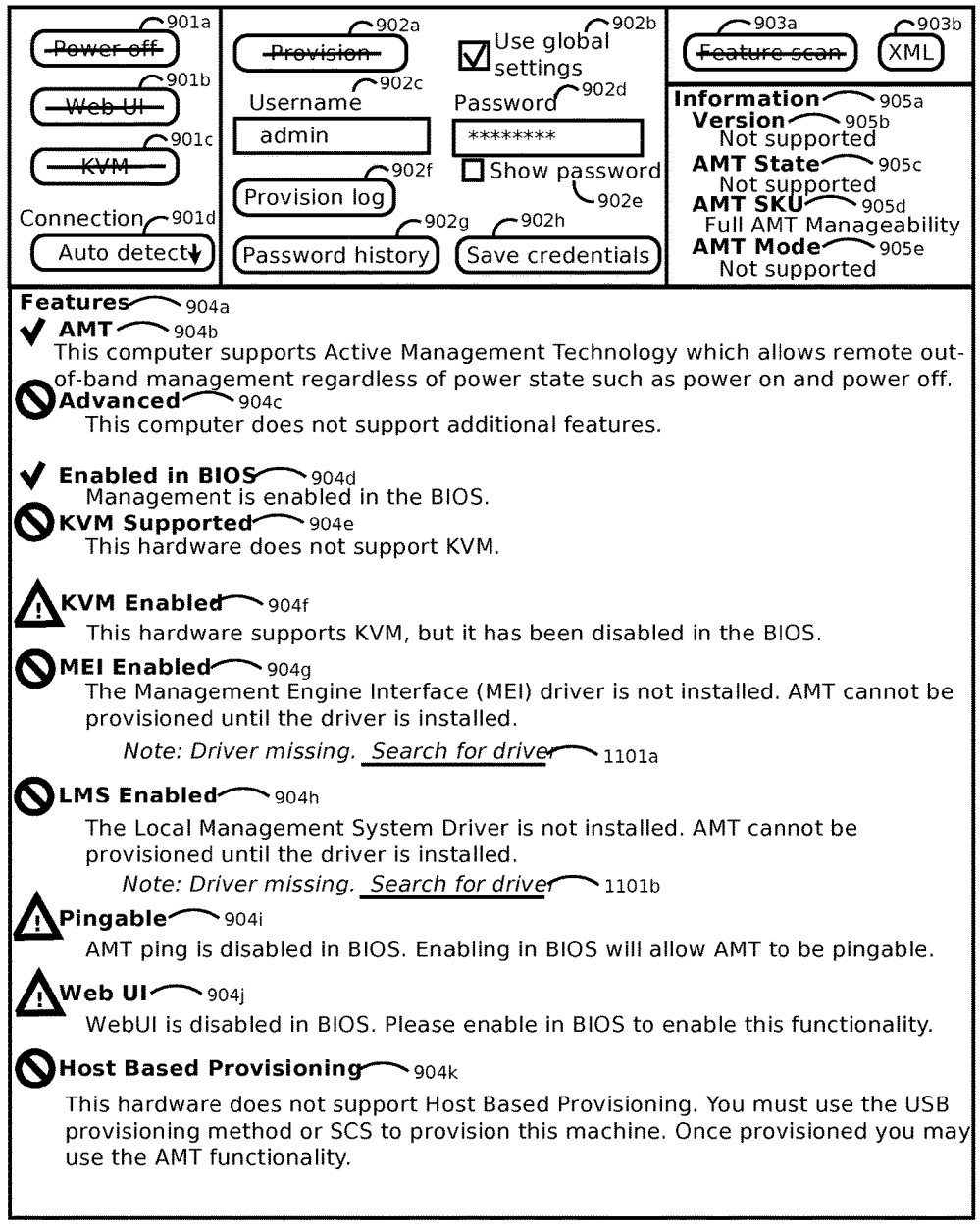
FIG. 11 is an illustrative example of an embodiment of a user interface for displaying the status of and controlling actions on a device being managed using out-of-band management that is not configured with a driver.

FIG. 11 is an illustrative example of an embodiment of a user interface for displaying the status of and controlling actions on a device being managed using out-of-band management that is not configured with a driver. Most of the controls and settings in FIG. 11 are the same as those illustrated earlier with respect to FIG. 9, so in the interest of clarity, this description of FIG. 11 illustrates the differences from FIG. 9. Much of the functionality of the OOB hardware may not be available without the driver, as may be seen in the number of items that are disabled in FIG. 11. The power toggle button control 901a may be gray and disabled, because it cannot be used without the driver to turn on and off the power for the device (one of 106a-106f). The web UI button 901b may be gray and disabled, because it cannot be used without the driver to start the web-based interface on the OOB hardware for the device (one of 106a-106f). The KVM button 901c may be gray and disabled, because it cannot be used without the driver to start the remote-control keyboard/video/mouse (KVM) function of the OOB hardware for the device (one of 106a-106f). The provisioning toggle button 902a may be gray and disabled, because it cannot be used without the driver to enable and disable the provisioning of the OOB hardware for the device (one of 106a-106f). The feature scan button 903a may be gray and disabled, because it cannot be used without the driver to initiate a scan of the OOB hardware for the device (one of 106a-106f). The advanced setting 904c may indicate that none of the additional management functions are available without the driver. The KVM supported setting 904e and KVM enabled setting 904f may indicate that remote KVM management is not supported or enabled without the driver. The MEI enabled setting 904g may indicate that OOB performance will not be improved without the driver. The LMS enabled setting 904h may indicate that OOB functionality will not be improved without the driver. The pingable setting 904i may indicate that the OOB hardware will not respond to ICMP ping without the driver. The web UI setting 904j may indicate that the OOB management interface will not allow control through an interface using a web browser without the driver. The host based provisioning setting 904k may indicate that the OOB hardware cannot be provisioned remotely without the driver. The information section 905a may have no information available in section 905b-905e without the driver.

The diagnostic displays 1101a-1101b may facilitate understanding and correcting the missing driver. The diagnostic 1101a can report that the MEI driver is missing, and can provide a link to search for the driver to resolve the problem. The diagnostic 1101b can report that the LMS driver is missing, and can provide a link to search for the driver to resolve the problem. It may be that the MEI driver and LMS driver are included in a single installation package from the vendor, and installing that package may resolve both issues. Selecting the link in the diagnostic 1101a or the link in the diagnostic 1101b may start the selection and provisioning of one or both drivers as previously described with respect to FIG. 4.

Figure 12:
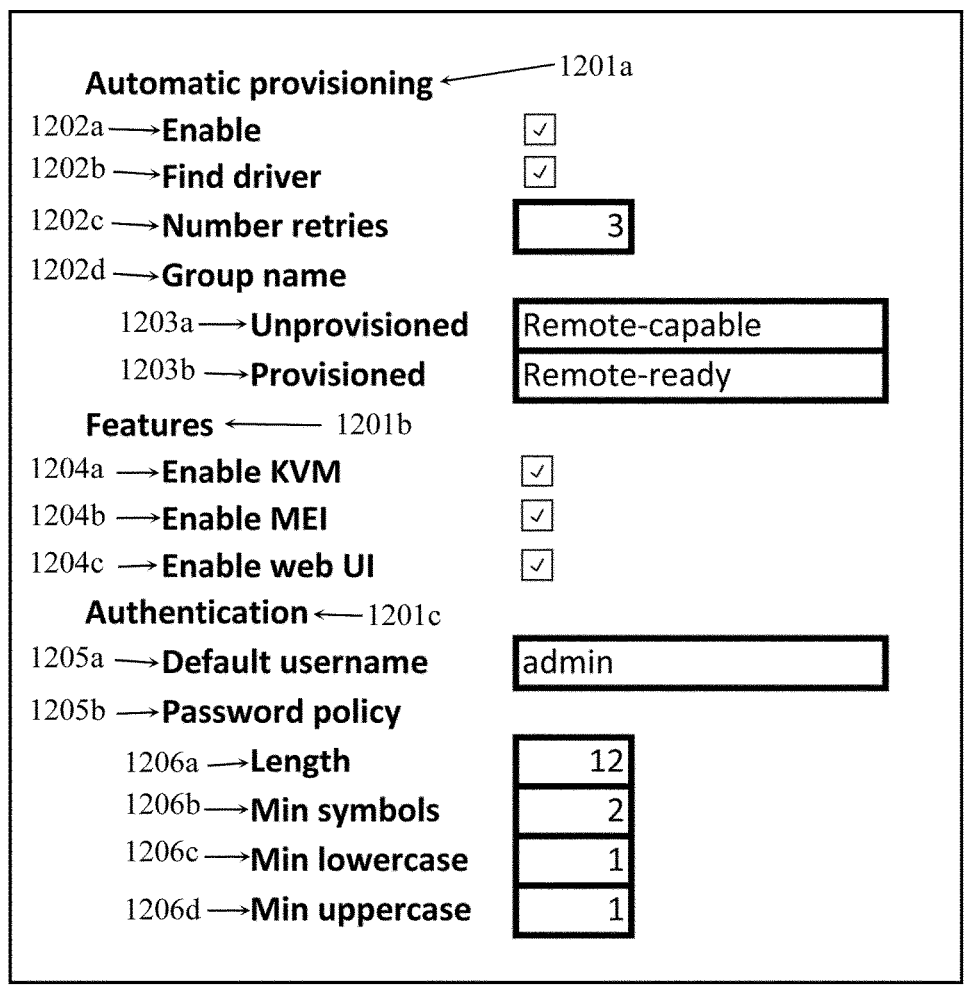
FIG. 12 is an illustrative example of an embodiment of a user interface for configuring a rule set for automatic provisioning of devices being managed using out-of-band management.

FIG. 12 is an illustrative example of an embodiment of a user interface for configuring a rule set for automatic provisioning of devices being managed using out-of-band management. The user interface in FIG. 12 may be for configuring the rule set 702 as previously described with respect to FIG. 7. The user interface may contain an automatic provisioning section 1201a, a features section 1201b, and an authentication section 1201c.

The automatic provisioning section 1201a may contain an enable check box 1202a that can determine whether new devices such as 106f will be automatically provisioned. The automatic provisioning section 1201a may contain a find driver check box 1202b that can determine whether an attempt will be made to find drivers for new devices such as 106f as previously described with respect to FIG. 4. The automatic provisioning section 1201a may contain a number retries setting 1202c that can determine the maximum number of times a new device such as 106f will be allowed to fail in automatic provisioning before further attempts to automatically provision the device such as 106f will be halted. The automatic provisioning section 1201a may contain a group name section 1202d that can identify groups 1203a-1203b within the management server 101 for classifying the new device such as 106f. These groups 1203a-1203b may facilitate management operations on collections of devices based on their characteristics. The unprovisioned setting 1203a can identify a group into which all new devices such as 106f should be added as members if the automatic provisioning for them fails. The provisioned setting 1203b can identify a group into which all new devices such as 106*f* should be added as members if the automatic provisioning for them succeeds.

The features section 1201*b* may contain an enable KVM setting 1204*a* that can determine whether remote KVM management will be enabled for a new device such as 106*f* if the OOB hardware for the device supports remote KVM management after provisioning. The features section 1201*b* may contain an enable MEI setting 1204*b* that can determine whether MEI extensions for improving OOB management performance will be enabled for a new device such as 106*f* if the OOB hardware for the device supports MEI extensions after provisioning. The features section 1201*b* may contain an enable web UI setting 1204*c* that can determine whether the web UI access to OOB management functions will be enabled for a new device such as 106*f* if the OOB hardware for the device supports the web UI after provisioning.

The authentication section 1201*c* may contain a default username setting 1205*a* that can determine the username that will be set up as a requirement for accessing the OOB management of a new device such as 106*f*. The authentication section 1201*c* may contain a password policy section 1205*b* that can determine parameters for generating the password that will be set up as a requirement for accessing the OOB management of a new device such as 106*f*. In the password policy section 1205*b*, the length setting 1206*a* can determine the length of a generated password in characters, the min symbols setting 1206*b* can determine the minimum number of symbols included in a generated password, the min lowercase setting 1206*c* can determine the minimum number of lowercase characters included in a generated password, and the min uppercase setting 1206*d* can determine the minimum number of uppercase characters included in a generated password.

Figure 13:
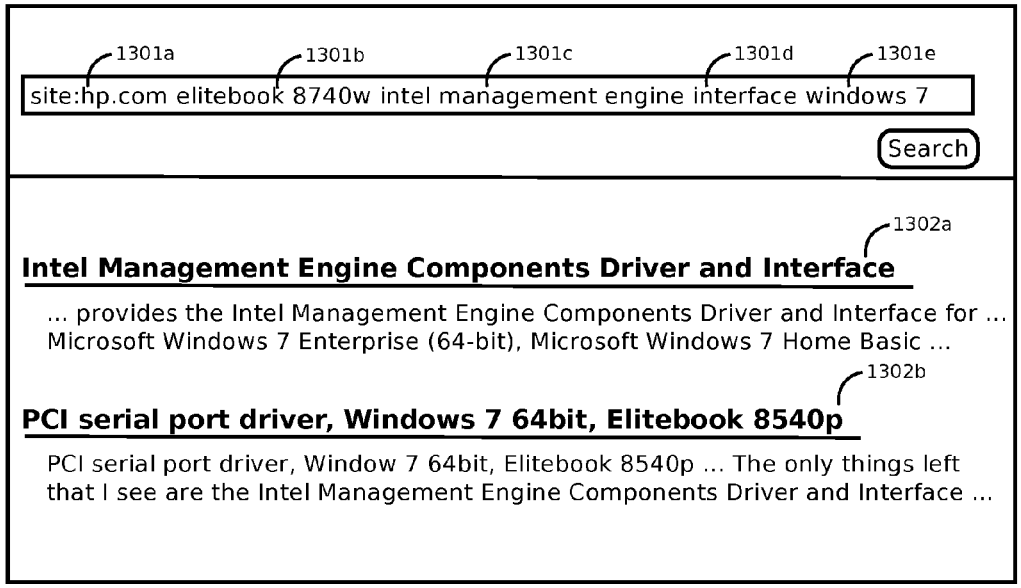
FIG. 13 is an illustrative example of an embodiment of a user interface for displaying and selecting search results for drivers for provisioning devices being managed using out-of-band management.

FIG. 13 is an illustrative example of an embodiment of a user interface for displaying and selecting search results for drivers for provisioning devices being managed using out-of-band management. The user interface in FIG. 13 may be used by the display generator module 302 to display search results from the search query interface module 401, as previously described with respect to FIG. 4. The search query may be composed of phrases 1301*a*-1301*e*. The phrase "site:hp.com" 1301*a* may be derived from the manufacturer of the device being provisioned. The phrase "elitebook 8740w" 1301*b* may be derived from the product and model of the device being provisioned. The phrase "intel management engine" 1301*c* may be derived from the name of the OOB management product for the device being provisioned. The phrase "interface" 1301*d* may be derived from the type of driver for the device being provisioned. The phrase "windows 7" 1301*e* may be derived from the operating system on the device being provisioned. The search results may provide a number of results such as 1302*a* and 1302*b*, along with some context information for each result that may facilitate selecting a proper result to use for finding the correct driver.

Figure 14:
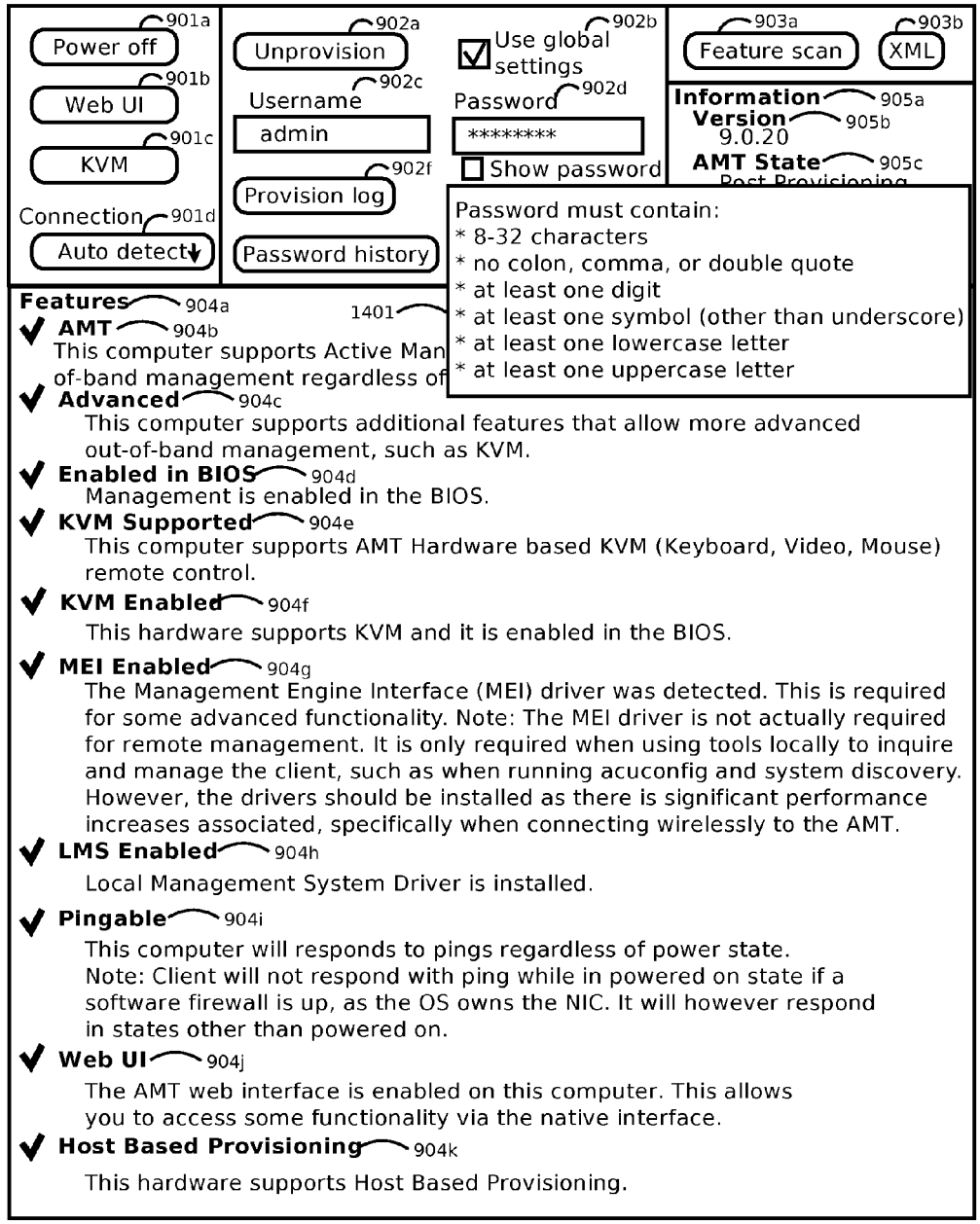
FIG. 14 is an illustrative example of an embodiment of a user interface for validating the configuration information for devices being managed using out-of-band management.

FIG. 14 is an illustrative example of an embodiment of a user interface for validating the configuration information for devices being managed using out-of-band management. By way of example, FIG. 14 shows validation for a password. The pop-up description 1401 may appear when the user starts to enter or modify a password, and may provide descriptive text that describes the rules for a valid password. The pop-up description 1401 may be closed and removed from the display when the user is finished entering a valid password.

Figure 15:
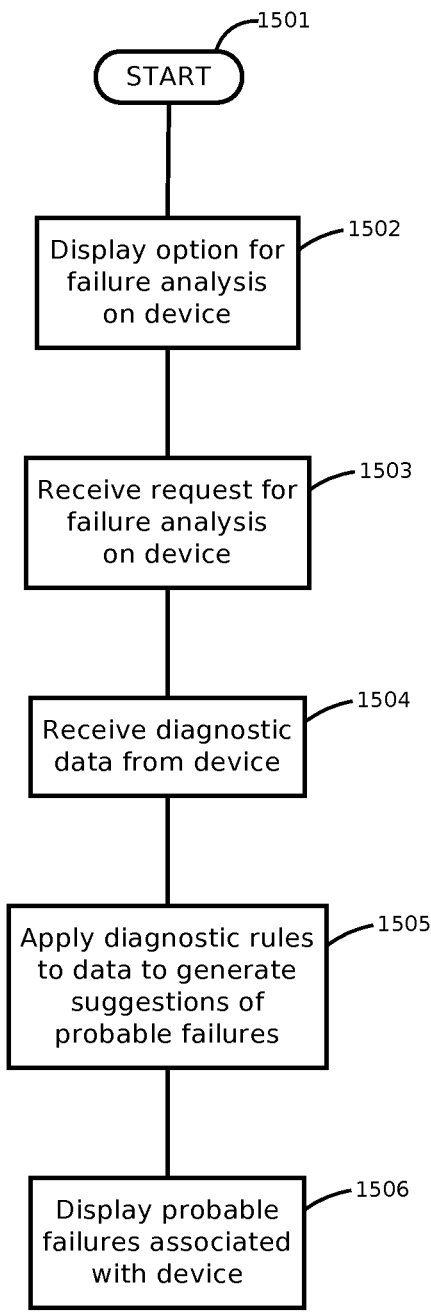
FIG. 15 is an illustrative flowchart depicting one embodiment of a method of diagnosing and providing failure analysis of out-of-band management of computing devices.

FIG. 15 is an illustrative flowchart depicting one embodiment of a method of diagnosing and providing failure analysis of out-of-band management of computing devices. The method 1501 can include displaying an option for failure analysis on a device (1502). The method 1501 can include receiving a request for failure analysis on a device (1503). The method 1501 can include receiving diagnostic data from a device (1504). The method 1501 can include applying diagnostic rules to diagnostic data and generating suggestions of probable failures (1505). The method 1501 can include displaying probable failures associated with a device (1506).

Figure 16:
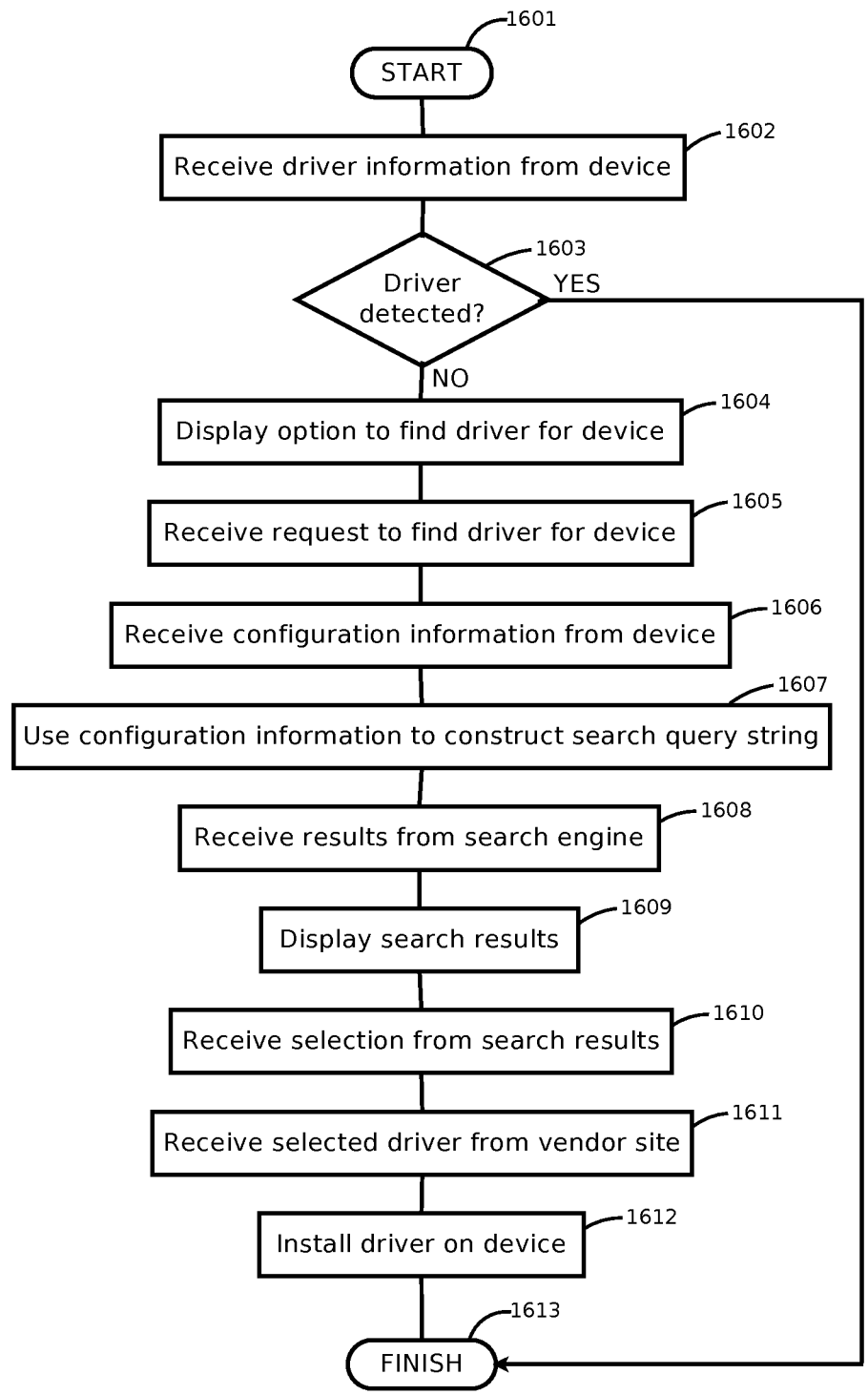
FIG. 16 is an illustrative flowchart depicting one embodiment of a method of facilitating the selection and provisioning of drivers for out-of-band management of computing devices.

FIG. 16 is an illustrative flowchart depicting one embodiment of a method of facilitating the selection and provisioning of drivers for out-of-band management of computing devices. The method 1601 can include receiving driver information from a device (1602). The method 1601 can include checking to see whether a driver was detected on a device (1603). In one embodiment, the method 1601 can include displaying an option to find a driver for a device (1604). In one embodiment, the method 1601 can include receiving a request to find a driver for a device (1605). In one embodiment, the method 1601 can include receiving configuration information from a device (1606). In one embodiment, the method 1601 can include using configuration from a device to construct a search query string (1607). In one embodiment, the method 1601 can include receiving results from a search engine (1608). In one embodiment, the method 1601 can include displaying search results from a search engine (1609). In one embodiment, the method 1601 can include receiving a selection of a search result by a technician (1610). In one embodiment, the method 1601 can include receiving a selected driver from a vendor site (1611). In one embodiment, the method 1601 can include installing a driver on a device (1612). The method 1601 can include joining a plurality of control flows (1613).

Figure 17:
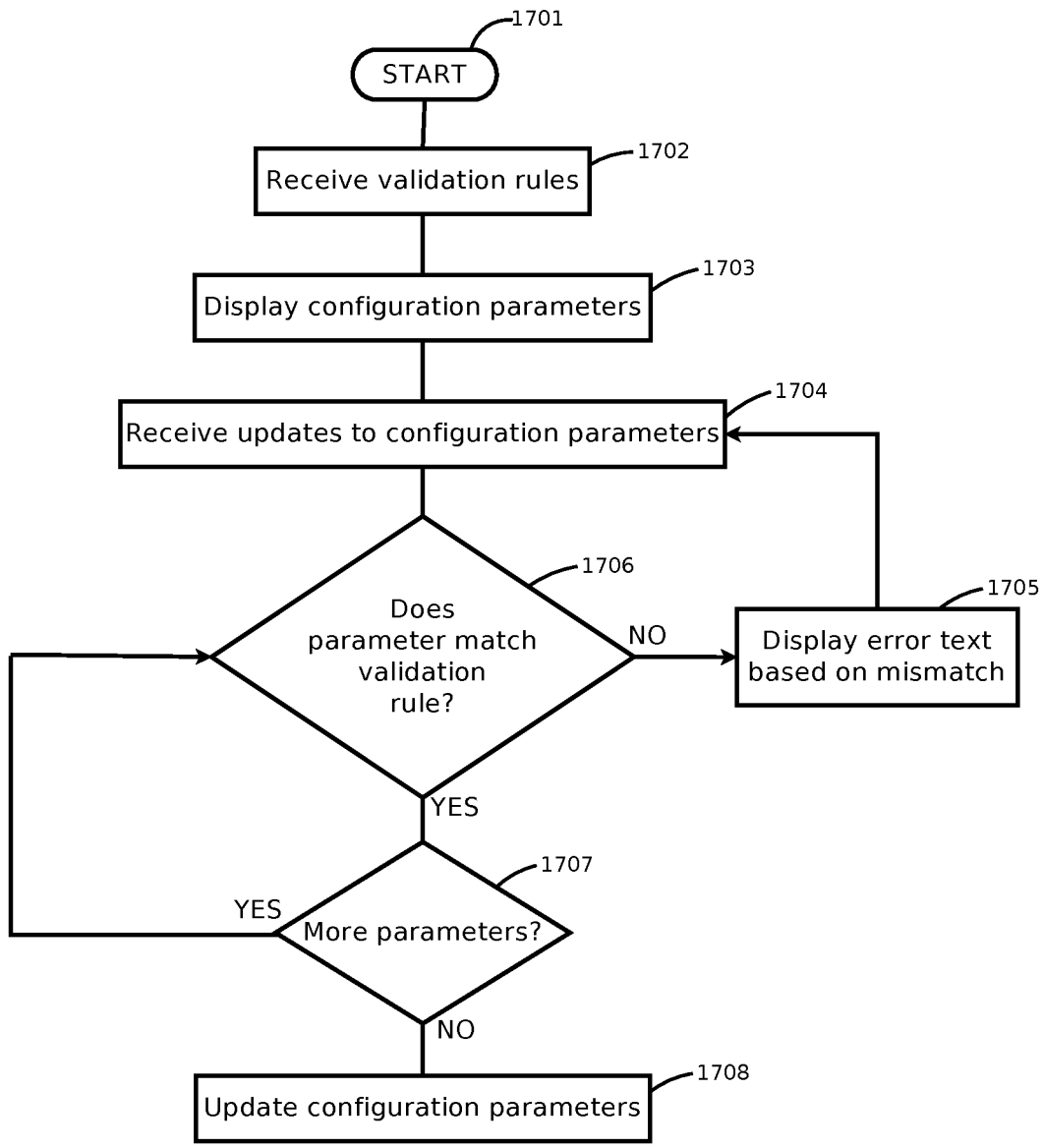
FIG. 17 is an illustrative flowchart depicting one embodiment of a method of facilitating the validation of configuration information for out-of-band management of computing devices.

FIG. 17 is an illustrative flowchart depicting one embodiment of a method of facilitating the validation of configuration information for out-of-band management of computing devices. The method 1701 can include receiving validation rules (1702). The method 1701 can include displaying configuration parameters (1703). The method 1701 can include receiving updates to configuration parameters (1704). In one embodiment, the method 1701 can include displaying error text based on a mismatch (1705). The method 1701 can include checking to see whether a parameter matches a validation rule (1706). The method 1701 can include checking to see whether there are more parameters to test (1707). The method 1701 can include updating configuration parameters (1708).

Figure 18:
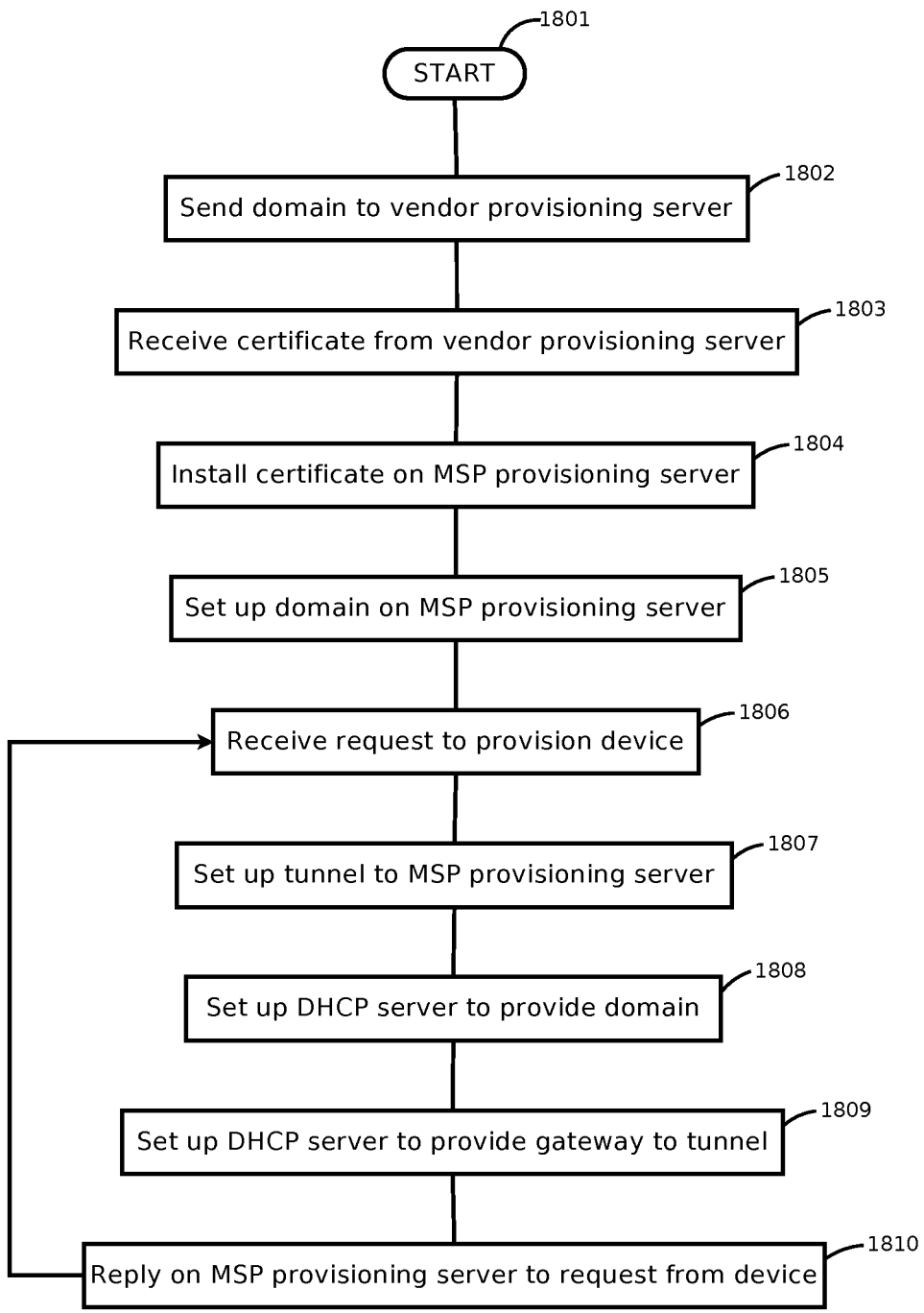
FIG. 18 is an illustrative flowchart depicting one embodiment of a method of automatically provisioning out-of-band management of computing devices.

FIG. 18 is an illustrative flowchart depicting one embodiment of a method of automatically provisioning out-of-band management of computing devices. The method 1801 can include sending a domain to a vendor provisioning server (1802). The method 1801 can include receiving a certificate from a vendor provisioning server (1803). The method 1801 can include installing a certificate on an MSP provisioning server (1804). The method 1801 can include setting up a domain on an MSP provisioning server (1805). The method 1801 can include receiving a request to provision a device (1806). The method 1801 can include setting up a tunnel to an MSP provisioning server (1807). The method 1801 can include setting up a DHCP server to provide a domain (1808). The method 1801 can include setting up a DHCP server to provide a gateway to a tunnel (1809). The method 1801 can include sending a reply from an MSP provisioning server to a request from a device (1810).

Figure 19:
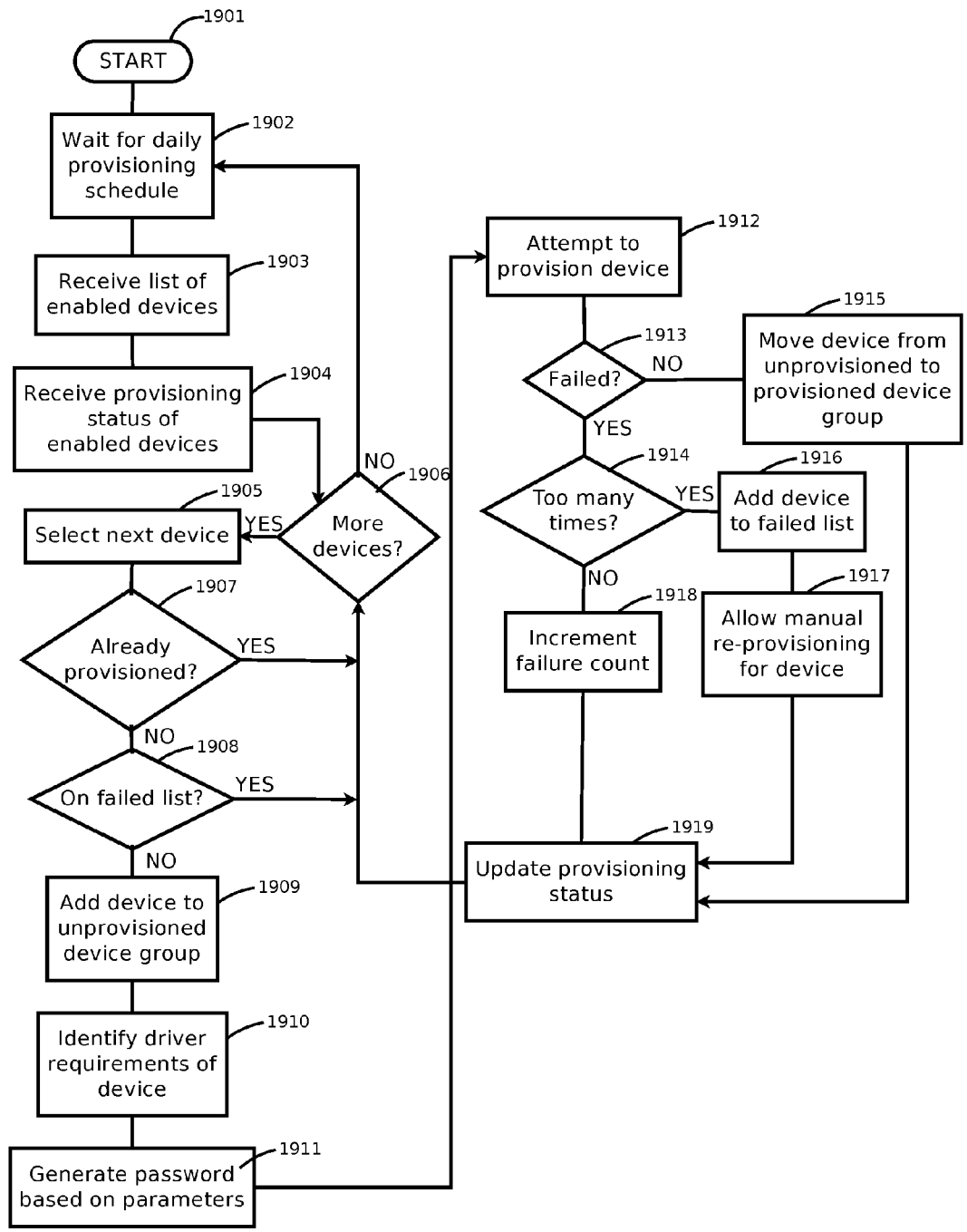
FIG. 19 is an illustrative flowchart depicting one embodiment of a method of using a rule set to automatically provision out-of-band management of computing devices.

FIG. 19 is an illustrative flowchart depicting one embodiment of a method of using a rule set to automatically provision out-of-band management of computing devices. The method 1901 can include waiting for a daily provisioning schedule (1902). The method 1901 can include receiving a list of enabled devices (1903). The method 1901 can include receiving the provisioning status of a list of enabled devices (1904). The method 1901 can include selecting a next device (1905). The method 1901 can include checking to see whether more devices are to be processed (1906). The method 1901 can include checking to see whether a device is already provisioned (1907). The method 1901 can include checking to see whether a device is on the failed list (1908). The method 1901 can include adding a device to the unprovisioned device group (1909). The method 1901 can include identifying the driver requirements of a device (1910). The method 1901 can include generating a password based on parameters (1911). The method 1901 can include attempting to provision a device (1912), as previously described with respect to FIG. 18. The method 1901 can include checking to see whether provisioning a device failed (1913). In one embodiment, the method 1901 can include checking to see whether provisioning a device has failed too many times (1914). In one embodiment, the method 1901 can include moving a device from the unprovisioned device group to the provisioned device group (1915). In one embodiment, the method 1901 can include adding a device to the failed list (1916). In one embodiment, the method 1901 can include allowing re-provisioning for a device (1917). In one embodiment, the method 1901 can include incrementing the failure count for a device (1918). The method 1901 can include updating the provisioning status for a device (1919).

Figure 20:
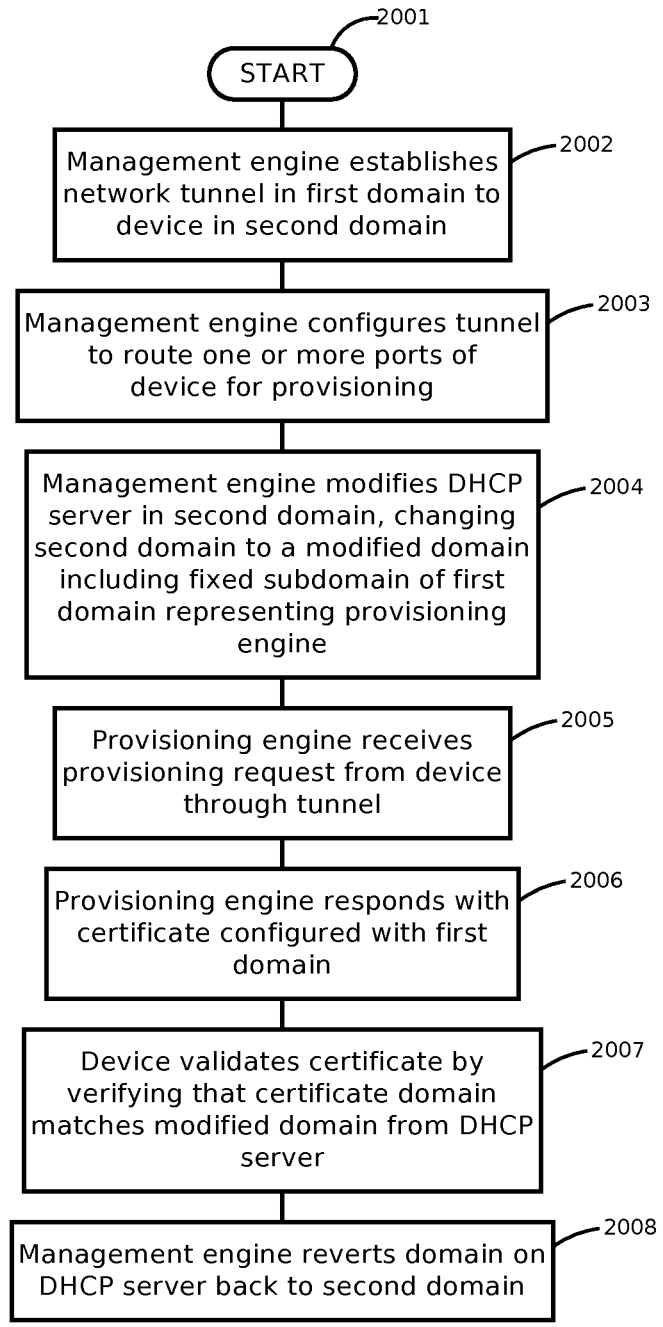
FIG. 20 is an illustrative flowchart depicting one embodiment of a method of provisioning an out-of-band system.

FIG. 20 is an illustrative flowchart depicting one embodiment of a method of provisioning an out-of-band system. The method 2001 can include a management engine that can be used to monitor, configure, and manage customer devices. The management engine may use an agent on a device under management, and may communicate with the agent in order to complete the functions for monitoring, configuring, and managing the device. The communication from the management engine to the device may include commands sent to the device indicating functions to be completed, such as changing an application configuration, changing a system configuration, running a program, deleting a file, transferring a file, testing a network connection, installing an application, sending an email, and so on. The communication from the device to the management engine may include status information, files, configuration settings, network scans, user status, and so on. The method 2001 can include the management engine establishing a network tunnel in the first domain to a device in the second domain (2002). In this way, devices in the second domain can access devices in the first domain as if they were on a local network in the first domain. For example, the tunnel can be a virtual private network (VPN), an SSH tunnel, a proprietary implementation, or any other type of tunnel. The management engine can set up the tunnel using devices in the first domain, devices in the second domain, devices in neither domain, or devices in both domains. The management engine may use existing devices to implement the tunnel, or may use a dedicated device that is designed to implement the tunnel. The method 2001 can include the management engine configuring the tunnel to route one or more ports of the device for provisioning (2003). The method 2001 can include the management engine modifying a DHCP server in the second domain, changing the second domain of the DHCP server to a modified domain that includes a fixed subdomain of the first domain, which can represent the provisioning engine (2004). The method 2001 can include the provisioning engine receiving a provisioning request from the device through the tunnel (2005). The method 2001 can include the provisioning engine responding with a certificate configured with the first domain (2006). The method 2001 can include the device validating the certificate by verifying that the certificate domain matches the modified domain obtained from the DHCP server (2007). The method 2001 can include the management engine reverting the domain on the DHCP server back to the second domain (2008).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any subject matter of what may be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of provisioning an out-of-band system comprising:
   establishing, by a management engine of a server of a first domain, a network tunnel with a device on a second domain different from the first domain, the network tunnel comprising at least one of a virtual private network ("VPN") or a secure socket shell ("SSH") configured to route one or more communication ports of the device for provisioning;
   modifying, by the management engine subsequent to establishing the network tunnel, via a dynamic host configuration protocol ("DHCP") server on the second domain, the second domain to a modified domain including a fixed subdomain of the first domain, the fixed subdomain corresponding to a provisioning engine of the first domain;
   receiving, by the provisioning engine from the device via the network tunnel established by the server of the first domain, responsive to the device obtaining the fixed subdomain of the first domain from the DHCP server, a provisioning request to initiate a provisioning cycle comprising at least one of configuring the device, diagnosing the device, or maintaining the device;
   transmitting, by the provisioning engine to the device via the network tunnel established by the server of the first domain, a certificate configured with the first domain, the device configured to validate the certificate based on the certificate matching the modified domain obtained from the DHCP server;
   reverting, by the management engine, responsive to completion of the provisioning cycle by the device, the modified domain to the second domain; and
   terminating, by the management engine, responsive to reverting the modified domain to the second domain and the completion of the provisioning cycle, the network tunnel comprising the at least one of the VPN or the SSH established by the server of the first domain and used to provision the device.

2. The method of claim 1, further comprising:
   transmitting, by the management engine, a command to a module of the device to establish the network tunnel.

3. The method of claim 1, further comprising:
   providing, to the device, an address of the provisioning engine associated with the fixed subdomain of the first domain.

4. The method of claim 1, further comprising:
   receiving, by the DHCP server from the device, a DHCP request; and
   transmitting, by the DHCP server to the device responsive to the DHCP request, the first domain.

5. The method of claim 1, wherein establishing the network tunnel further comprises:
   establishing, by the management engine, an Internet Protocol tunnel.

6. The method of claim 1, further comprising:
   using secure sockets layer ("SSL") to establish the network tunnel.

7. The method of claim 1, further comprising:
   receiving, by the provisioning engine, the certificate configured with the first domain from a vendor provisioning server on a third domain different from the first domain and the second domain.

8. The method of claim 1, further comprising:
   receiving, by the management engine from the device, a confirmation of provisioning.

9. The method of claim 1, further comprising:
   validating, by the device, the provisioning engine responsive to the matching certificate.

10. A system for provisioning an out-of-band system comprising:
    a server of a first domain including a processor and memory;
    a management engine of the server that establishes a network tunnel with a device on a second domain different from the first domain, the network tunnel comprising at least one of a virtual private network ("VPN") or a secure socket shell ("SSH") configured to route one or more communication ports of the device for provisioning;
    the management engine modifies, subsequent to establishing the network tunnel, via a dynamic host configuration protocol ("DHCP") server on the second domain, the second domain to a modified domain including a fixed subdomain of the first domain, the fixed subdomain corresponding to a provisioning engine of the first domain;

the provisioning engine of the first domain that receives, from the device via the network tunnel established by the server of the first domain, responsive to the device obtaining the fixed subdomain of the first domain from the DHCP server, a provisioning request to initiate a provisioning cycle comprising at least one of configuring the device, diagnosing the device, or maintaining the device;

the provisioning engine transmits, to the device via the network tunnel established by the server of the first domain, a certificate configured with the first domain, the device configured to validate the certificate based on the certificate matching the modified domain obtained from the DHCP server;

the management engine reverts, responsive to completion of a provisioning cycle by the device, the modified domain to the second domain; and the management engine terminates, responsive to reverting the modified domain to the second domain and the completion of the provisioning cycle, the network tunnel comprising the at least one of the VPN or the SSH established by the server of the first domain and used to provision the device.

11. The system of claim 10, wherein the server is further configured to:

transmit a command to a module of the device to establish the network tunnel.

12. The system of claim 10, wherein the server is further configured to:

provide, to the device, an address of the provisioning engine associated with the fixed subdomain of the first domain.

13. The system of claim 10, wherein the DHCP server is further configured to:

receive, from the device, a DHCP request; and transmit, to the device responsive to the DHCP request, the first domain.

14. The system of claim 10, wherein the management engine is further configured to:

establish an Internet Protocol tunnel.

15. The system of claim 10, wherein the management engine is further configured to:

use secure sockets layer ("SSL") to establish the network tunnel.

16. The system of claim 10, wherein the provisioning engine is further configured to:

receive the certificate configured with the first domain from a vendor provisioning server on a third domain different from the first domain and the second domain.

17. The system of claim 10, wherein the management engine is further configured to:

receive, from the device, a confirmation of provisioning.

18. The system of claim 10, wherein the device is further configured to:

validate the provisioning engine responsive to the matching certificate.

* * * * *